United States Patent [19]

Olnowich et al.

[11] Patent Number: 5,734,826
[45] Date of Patent: Mar. 31, 1998

[54] VARIABLE CYCLIC REDUNDANCY CODING METHOD AND APPARATUS FOR USE IN A MULTISTAGE NETWORK

[75] Inventors: Howard Thomas Olnowich, Endwell, N.Y.; Miguel Mario Blaum, San Jose; Jehoshua Bruck, Palo Alto, both of Calif.

[73] Assignee: International Business Machines Corporation, Armonk, N.Y.

[21] Appl. No.: 946,513

[22] Filed: Sep. 17, 1992

Related U.S. Application Data

[63] Continuation-in-part of Ser. No. 677,543, Mar. 29, 1991, abandoned, Ser. No. 799,497, Nov. 27, 1991, abandoned, and Ser. No. 799,602, Nov. 27, 1991, abandoned.

[51] Int. Cl.⁶ ..................................................... H01J 13/00
[52] U.S. Cl. ............................. 395/200.15; 395/185.05; 371/37.7; 370/410; 364/238.1; 364/242.94; 364/DIG. 1
[58] Field of Search .................. 395/800, 200.15, 395/185.05; 370/410; 371/37.1, 37.2, 37.3, 37.4, 37.5, 37.6, 37.7; 364/238.1, 242.94, DIG. 1

[56] References Cited

U.S. PATENT DOCUMENTS

| | | | |
|---|---|---|---|
| 4,520,481 | 5/1985 | Israel | 371/37.1 |
| 4,644,351 | 2/1987 | Zabarsky et al. | 340/825.44 |
| 4,748,617 | 5/1988 | Drewlo | 359/121 |
| 4,908,828 | 3/1990 | Tikalsky | 371/69.1 |
| 4,965,788 | 10/1990 | Newman | 370/60 |
| 5,132,975 | 7/1992 | Avaneas | 371/37.6 |
| 5,224,106 | 6/1993 | Weng | 371/37.4 |

OTHER PUBLICATIONS

IBM TDB vol. 33, No. 5, Oct., 1990, "Asynchronous Digital Video Switching System", by Farrell et al, pp. 227–233.

*Primary Examiner*—John E. Harrity
*Attorney, Agent, or Firm*—Richard M. Goldman; Lynn Augspurger; Shelley Beckstrand

[57] ABSTRACT

An error checking method and apparatus for appending a variable number of redundancy coding information at the end of each data message or packet transmitted over a multi-stage network for the purpose of protecting the data by using an error detecting code. The amount of additional redundancy coding information implemented is variable and increases with the size of the data message or packet to provide a consistent level of protection.

7 Claims, 18 Drawing Sheets

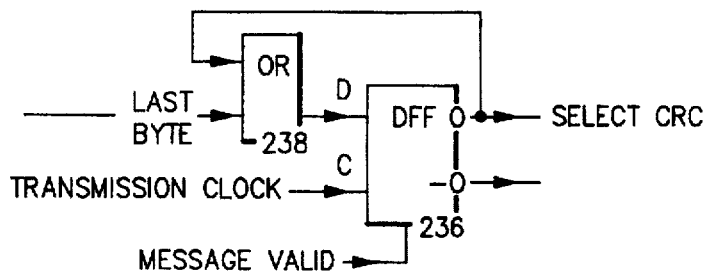
FIG.11B
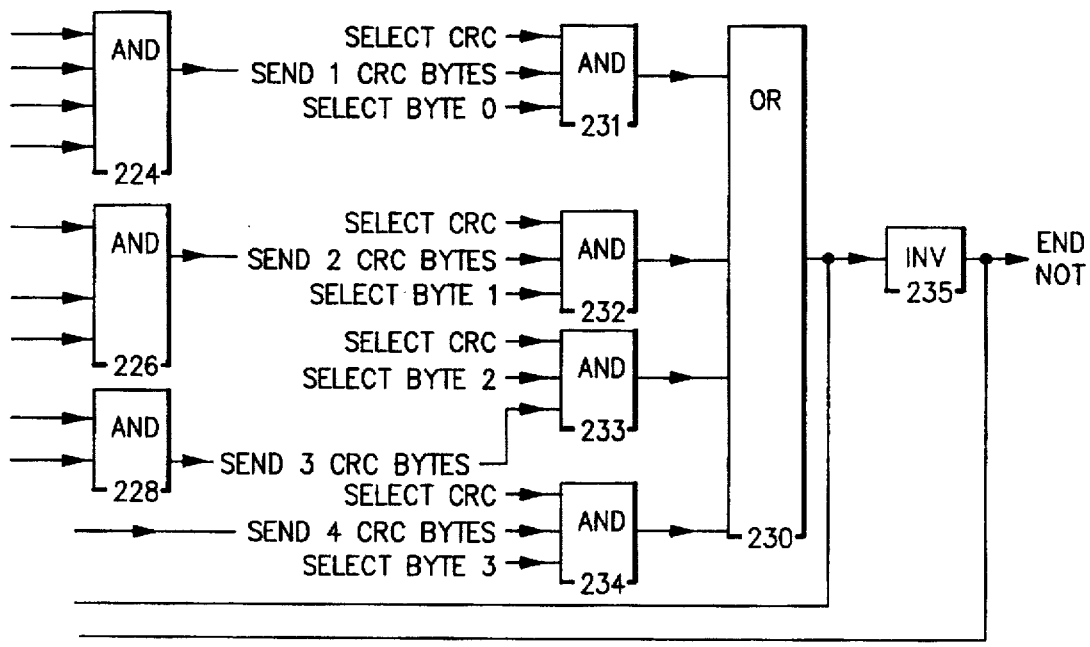
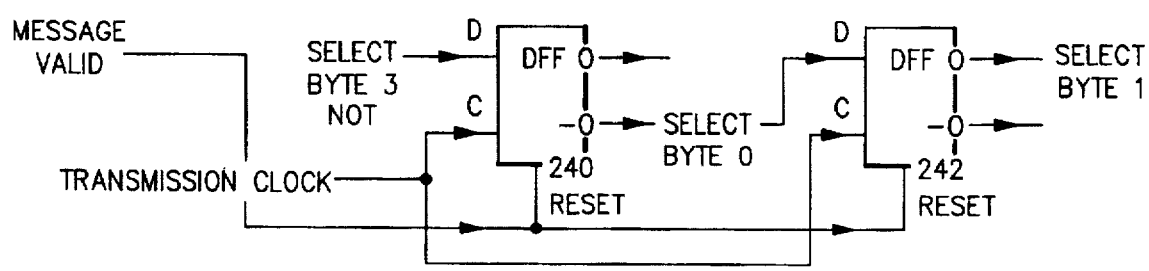
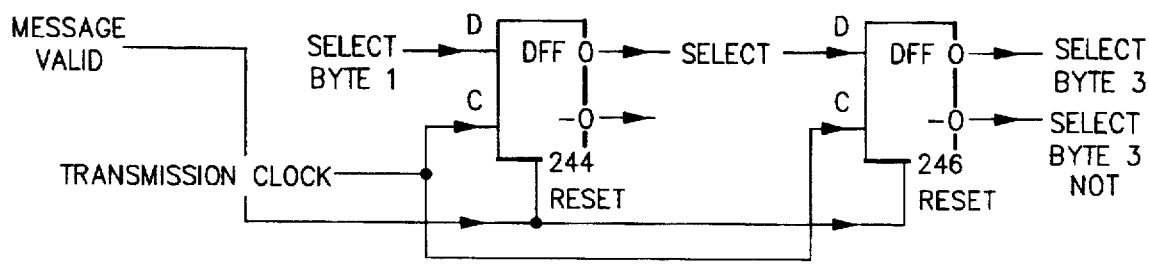

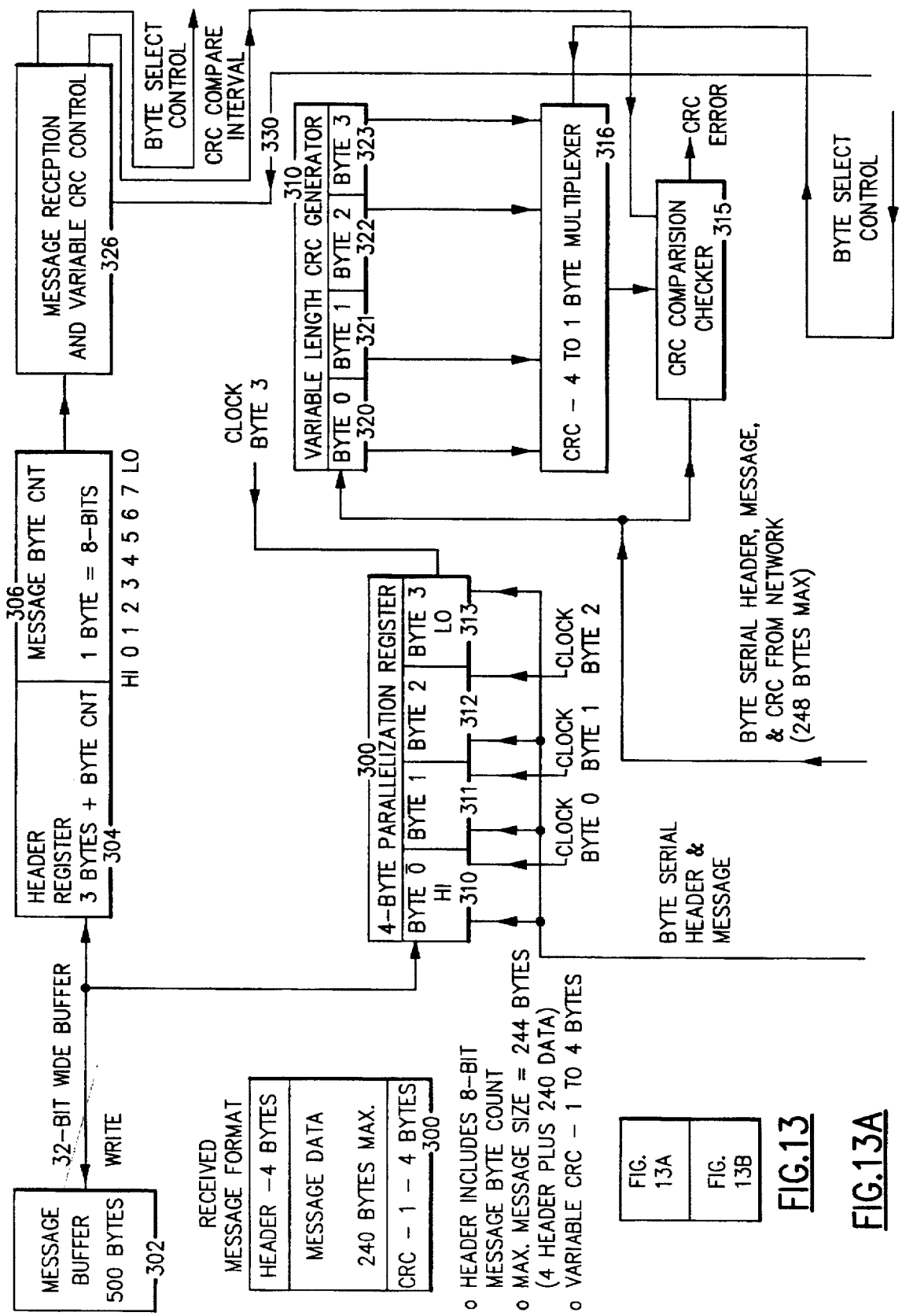

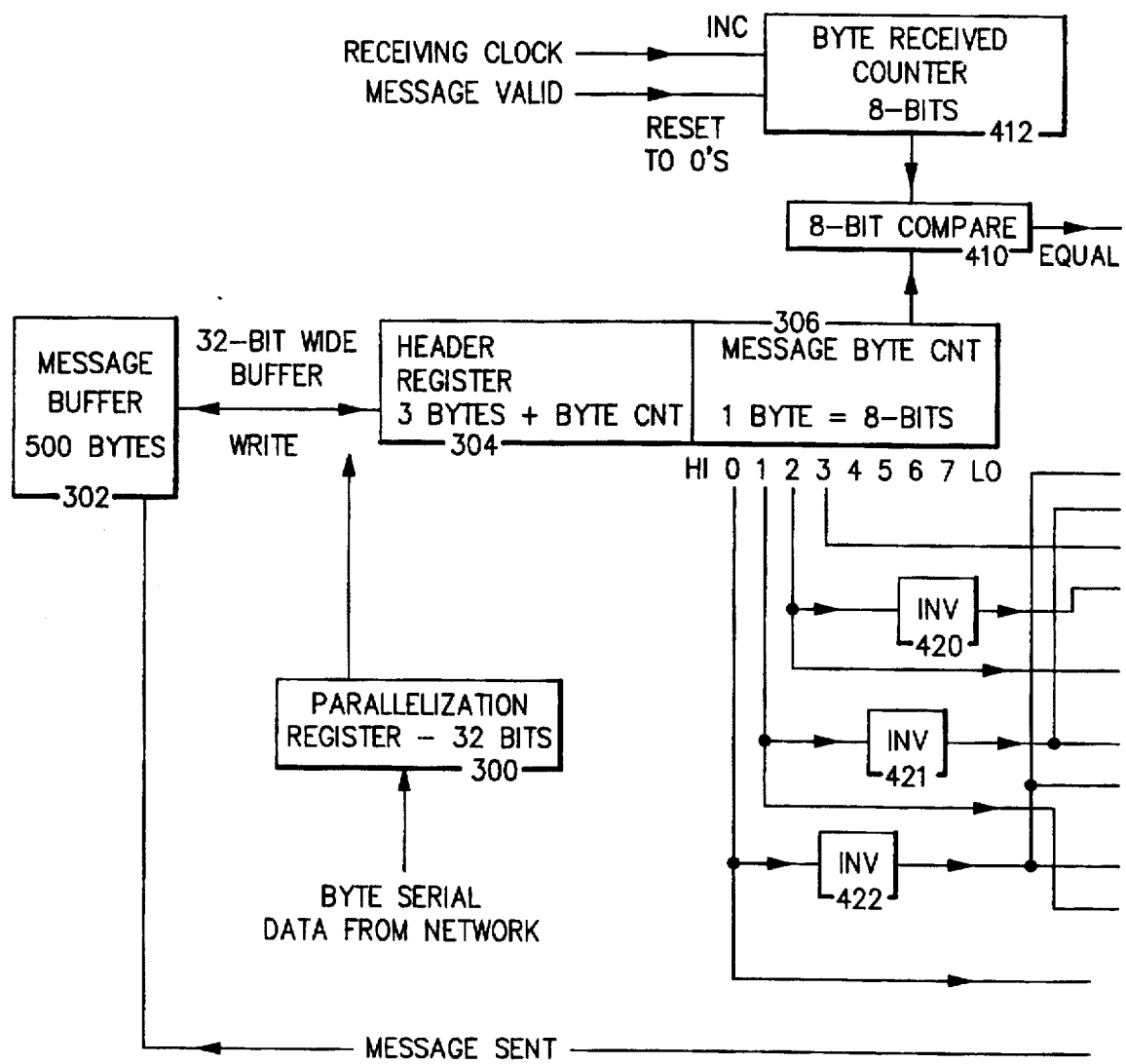
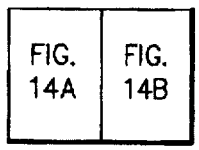
FIG.14A
FIG.14

VARIABLE CYCLIC REDUNDANCY CODING METHOD AND APPARATUS FOR USE IN A MULTISTAGE NETWORK

RELATED APPLICATIONS

The present United States patent application claims priority as a continuation-in-part application and is related to the following applications:

U.S. Ser. No. 07/677,543, filed Mar. 29, 1991, entitled "All-Node Switch, An Unclocked, Unbuffered Asynchronous Switching Apparatus", by P. A. Franaszek et al. now abandoned and continued as U.S. Ser. No. 08/457,789, filed Jun. 2, 1995, and U.S. Ser. No. 07/799,497, Filed Nov. 27, 1991, entitled "Multi-Function Network" by H. T. Olnowich, et al. now abandoned and continued as U.S. Ser. No. 08/216,789, filed Mar. 23, 1994, now abandoned and continued as U.S. Ser. No. 08/606,232, filed Feb. 23, 1996 and U.S. Ser. No. 07/799,602, Filed Nov. 27, 1991, entitled "Multi-Media Serial Line Switching Adapter for Parallel Networks and Hererogenous and Homologous Computer Systems", by H. T. Olnowich, et al. now abandoned and continued as (1) U.S. Ser. No. 08/390,893, filed Feb. 15, 1995, now U.S. Pat. No. 5,535,373 and (2) U.S. Ser. No. 08/178,957, now abandoned and continued as U.S. Ser. No. 08/521,774, filed Aug. 31, 1995.

The present application is also related to the following applications filed concurrently herewith:

U.S. Ser. No. 07/947,196, filed Sep. 17, 1992, now U.S. Pat. No. 5,384,773, entitled "Multi-Media Analog/Digital/Optical Switching Apparatus", by H. T. Olnowich et al, and, U.S. Ser. No. 07/946,204, filed Sep. 17, 1992, now U.S. Pat. No. 5,495,474, entitled "Switch-Based MicroChannel Planar Apparatus" by H. T. Olnowich et al, and, U.S. Ser. No. 07/946,512, filed Sep. 17, 1992, now abandoned, and continued as U.S. Ser. No. 08/316,620 filed Sep. 30, 1994, now abandoned, entitled "Switch-Based Personal Computer interconnection Apparatus" by H. T. Olnowich et al, and, U.S. Ser. No. 07/947,644, filed Sep. 17, 1992, now abandoned and continued as U.S. Ser. No. 08/286,107, filed Aug. 4, 1994, entitled "Slave MicroChannel Apparatus for Converting to Switch Architecture" by H. T. Olnowich et al, and, U.S. Ser. No. 07/946,506, filed Sep. 17, 1992, now abandoned and continued as U.S. Ser. No. 08/381,669, filed Jan. 30, 1995, entitled "Master MicroChannel Apparatus for Converting to Switch Architecture" by H. T. Olnowich et al, and, U.S. Ser. No. 07/946,203, filed Sep. 17, 1992, now U.S. Pat. No. 5,408,646, entitled "Multipath Torus Switching Apparatus" by H. T. Olnowich et al, and, U.S. Ser. No. 07/947,010, filed Sep. 17, 1992, entitled "Signal Regeneration Apparatus for Multi-Stage Transmissions", by H. T. Olnowich et al, and, U.S. Ser. No. 07/947,023, filed Sep. 17, 1992, now issued as U.S. Pat. No. 5,345,229, entitled "Adaptive Switching Apparatus for Multi-Stage Networks", by H. T. Olnowich et al, and, U.S. Ser. No. 07/946,986, filed Sep. 17, 1992, now U.S. Pat. No. 5,404,537, entitled "Priority Interrupt Switching Apparatus for Real Time Systems", by H. T. Olnowich et al, and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference.

FIELD OF THE INVENTIONS

The present invention relates to digital computer systems comprised of several or many computing and/or input/output elements, and the ability of the said individual elements to perform high speed, low-latency communications with each other in a parallel fashion over switching networks.

In addition, the present invention relates to digital computer systems comprised of several or many computing and/or input/output elements, and the ability of the said individual elements to communicate as message passing nodes of a parallel systems by sending information between nodes in the form of data messages of variable size, and the further ability to check the said data messages for accuracy using cyclic redundancy coding methods.

GLOSSARY OF TERMS

Cyclic Redundancy Coding

The capability of transmitting an increased number of specially coded bits with a data message for the purpose of detecting errors in the transmitted data by regenerating the same code when the message is received and comparing it to the transmitted coding.

CRC

Abbreviation for Cyclic Redundancy Coding

Data Message

A format for sending information between nodes of a parallel system incorporating the further ability to check the said information for accuracy using cyclic redundancy coding methods.

Data

Another term for Data Message

Functional Elements

Any processor or I/O device connected in the form of a processor card or expansion card to the multi-stage network incorporated on the disclosed planar.

Message

Another term for Data Message

Node

A functional element of the system comprised of one or more processor and/or expansion cards interconnected by a standard bus, which in turn connects to to the switching network as a single port of the network.

Nodal element

Another term for node, which has the same meaning.

Packet

A single portion of a subdivsion of a data message for transmission over a switching network.

Port

A single bi-directional entry and exit point to a switching network.

Receiving Node

A functional element of the system comprised of one or more processor and/or expansion cards interconnected by a standard bus to a switching network, which is receiving data transmitted over the switching network.

Sending Node

A functional element of the system comprised of one or more processor and/or expansion cards interconnected by a standard bus to a switching network, which is transmitting data over the switching network.

BACKGROUND OF THE INVENTIONS

Parallel computing systems consist of a plurality of processors that communicate via an interconnection network. The data that is sent between processors is typically protected by an error detecting/correcting code. A common approach is to use a fixed data length and to add the redundancy in the form of extra bytes at the end of the data. For example, in the IBM Vulcan prototype Parallel Processor, every 62 bytes of data are appended with 2 bytes of redundancy, as described in "On Error Detecting Techniques for the Vulcan Switch", by Jehoshua Bruck and Mario Blaum, Computer Science, RJ 7473 (69988), 5/11190. In this case, the data transmission approach used is packet switching, where a data message can be subdivided into a number of smaller packets. The redundancy coding is added independently of the packets boundaries taking advantage of the fact that the communication is synchronous and that the data is recovered at each stage as it is transmitted through the Vulcan multi-stage network. Idle characters are transmitted in between data packets and the coding is generated every 64 transmission clock times, regardless of whether data or idle bytes are being transmitted. This occurs as individual checking operations over every link in the Vulcan network to guarantee the integrity of each link on a real time basis, whether is transmitting valid data or not.

On the other hand, the method of adding the redundancy coding based on fixed time period is impossible to support in a switch network transmission system which does not recover and check the data at each stage of transmission. An example of such a system is the distributed and fully parallel switching network implemented by the ALLNODE Switch (Asynchronous, Low Latency, inter-NODE switch), which is disclosed in U.S. Ser. No. 07/677,543 now abandoned and continued as U.S. Ser. No. 08/457,789 filed Jun. 2, 1995, and adapted by the present invention to perform variable redundancy coding. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description a way whereby the ALLNODE switch and the present invention can be used to provide more efficient CRC techiqnues.

In an asynchronous interconnection network, such as an Allnode switch network, the redundancy bytes are added at the end of a data message or packet, if the transmission of the data message is subdivided into individual packets. However, in the state-of-the-art systems the message or packet size must be either held constant for all transmissions for the purpose of generating and checking based an easily implemented error detecting/correcting code; or if the message or packet size is variable, the protection provided by an error detecting/correcting code must always be based on the largest possible message or packet to provide a single code that will always guarantee protection across all possible message or packet sizes. This is very inefficient because the amount of redundancy coding increases as the message or packet size increases, as explained by Robert Swanson in "Understanding Cyclic Redundancy Codes", Computer Design, November, 1975. The amount of redundancy coding required must be based on the largest message or packet, therefore, smaller messages or packets are forced to carry unecessary redundancy coding for the purpose of mantaining a consistent code and a consistent number of additional coding bits or bytes.

The challenge is to add variable redundancy bytes to packets to achieve uniform reliability. Variable redundancy reflects the fact that while the number of message or packet bytes is variable, the coding rate should be kept a constant. It is natural that, for a smaller number of information bytes, we would like to add a smaller number of redundant bytes, since the probability of error is also smaller.

One possible solution to this problem is to use different codes in parallel, each one with its own redundancy. However, this would complicate the hardware.

The present invention method is to use only a single circuit to encode and to decode, avoiding hardware duplication. The purpose of this invention is to show how to achieve such an efficient implementation. We present a method and apparatus to construct CRC codes and efficient encoders and decoders that support variable redundancy. The only related known prior art is described in "Error Correction Capability Varied Track Location on a Magnetic or Optical Disk", by Blaum et al, U.S. Pat. No. 5,068,858, where a variable error correcting capability is introduced to address a need for different reliability requirements for different areas on a disk. The present invention discloses an efficient variable error detection scheme while U.S. Pat. No. 5,068,858 disclosed a variable error correcting scheme.

Previous work in regards to methods for implementing CRC schemes have followed the lines of being either serial or parallel generations of the coding method. The present invention follows in general the parallel generation techniques as descibed by Karl M. Helness in "implementation of a Parallel Cyclic Redundancy Check Generator", Computer Design, March 1974.

Previous work in regards to defining efficient redundancy codes and there implementations have led to universal codes. The particular work of interest in relation to the present invention is described by R. E. Blahut in "A Universal Reed-Solomon Decoder", IBM Journal of Research and Development, vol.28, no.2, 0384, p150–158.

SUMMARY OF THE INVENTION

The invention is a cyclic redundancy method and apparatus for adding a variable number of additional redundancy coding information at the end of each data message or packet for the purpose of protecting the data by using an error detecting code. The amount of additional redundancy coding information implemented is variable and increases with the size of the data message or packet to provide a consistent level of protection.

The preferred application of the invention is in regards to message passing parallel systems interconnected by a fully parallel switching means. The preferred switching means is the basic digital asynchronous and unbuffered switching concept disclosed in U.S. Ser. No. 07/677,543, "All-Node Switch, An Unclocked, Unbuffered Asychronous Switching Apparatus" by H. T. Olnowich et al now abandoned and continued as U.S. Ser. No. 08/457,789, filed Jun. 2, 1995. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

Figure 1:
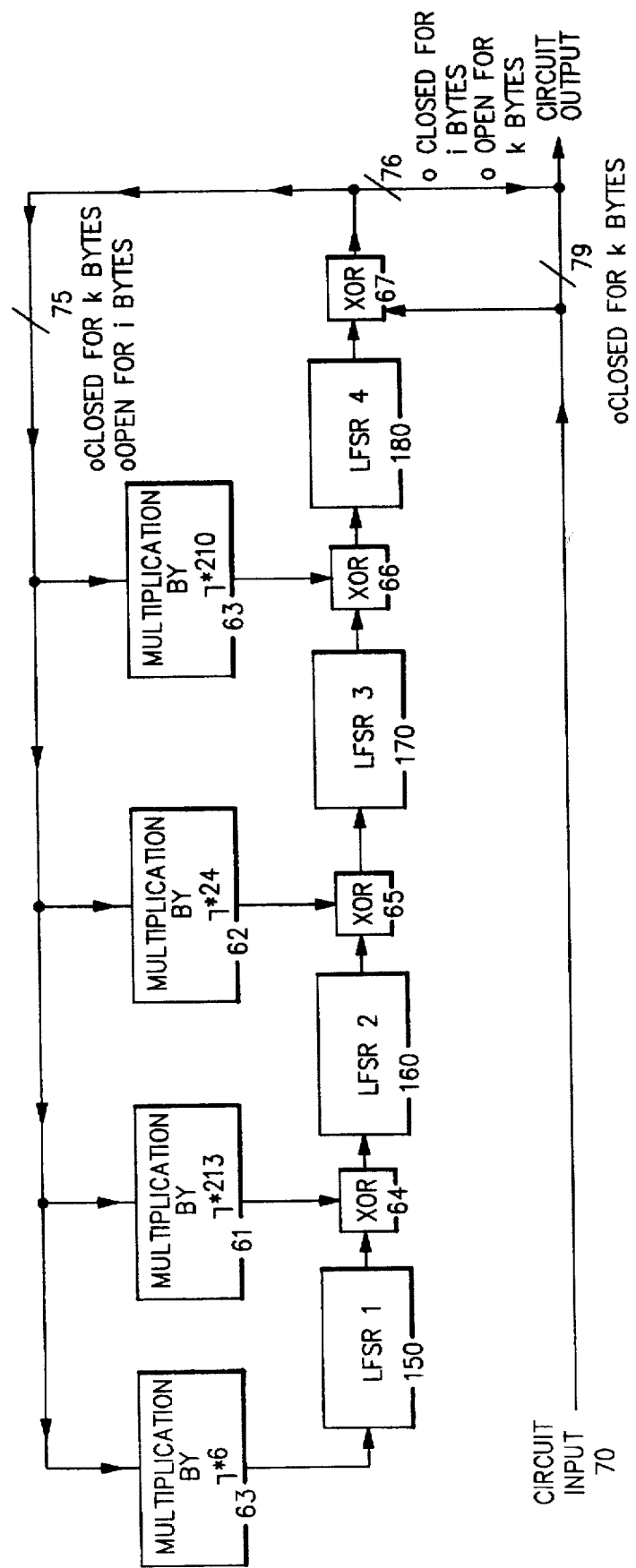
FIG. 1 illustrates generally our preferred encoding circuit for the present invention of the variable cyclic redundancy coding method, which has the capability of appending a variable length CRC code depending upon the size of the associated data messages.

DETAILED DESCRIPTION OF THE PREFERRED METHOD and EMBODIMENT

The present scheme involves a new method for generating and checking variable size data messages or packets efficiently at a constant reliability. The preferred universal redundancy coding scheme is Reed-Solomon described by R. E. Blahut in "A Universal Reed-Solomon Decoded", IBM Journal of Research and Development, vol.28, no.2, 0384, p150–158. The key ideas that form the basis of the present invention method are as follows:

1. Let L be the maximum packet size and let M be the number of redundancy bytes we would like to add to a packet. For every message of size $0<l\leq L$, we have a predetermined parameter $0<m\leq M$ that specifies the number of redundancy bytes that we would like to add to the packet.

2. At the encoder: for every packet of length l compute M CRC bytes by using a standard CRC encoder which is based on a linear feedback shift register (LFSR) that operates in real time. Select the first m redundancy bytes out of the M computed redundancy bytes and append it to the packet.

3. At the decoder: compute the M redundancy bytes using a LFSR and compare the first m bytes out of it with the appended redundancy bytes.

4. An implementation detail. For selecting the right number of redundancy bytes, it is assumed that there is an indication of the packet size or alternatively there is an indication of the end of the packet.

5. Correctness and performance. When using the LFSR to compute the redundancy bytes associated with a Reed-Solomon code then the error detection capability of our scheme is as follows: in a packet with $0\leq m\leq M$ redundancy bytes, up to m byte errors are detected.

The preferred implementation is described by way of example where the redundancy coding information and the LFSR are represented with 8-bit bytes, while considering a maximum of M=4 redundant bytes. Hence, the number of redundant bytes can vary from 0 to 4. On the basis of the example, those skilled in the art will have no difficulty in designing the apparatus for appending a variable number of redundancy bytes, the apparatus for the decoder, as well as extending our results to other codes with different redundancies and byte sizes.

The encoder is a functional element of the present invention that generates the additional redundancy coding information which is appended to the end of each data message or packet. The encoder is based on the linear feedback shift register (LFSR), that operates in real time. Further describing the LFSR for the encoder, each byte is represented as an 8-bit polynomial on α as follows:

$$a0+a1\alpha+a2\alpha^2+a3\alpha^3+a4\alpha^4+a5\alpha^5+a6\alpha^6+a7\alpha^7.$$

The field GF(256) is defined by the primitive polynomial $$f(x)=1+x^2+x^3+x^5+x^8.$$

The CRC polynomial is $$g(x)=(x+1)(x+\alpha)(x+\alpha^2)(x+\alpha^3)=\alpha^6+\alpha^{213}x+\alpha^{24}x^2+\alpha^{210}x^3+x^4.$$

In vector form, α is $$\alpha=01000000.$$

The CRC bytes are obtained as follows: given an information polynomial $u(x)$ of degree $\leq 250$, let $r(x)$ be the residue of dividing $x^4u(x)$ by $g(x)$. The degree of $r(x)$ is $\leq 3$. The encoded polynomial is then $r(x)+x^4u(x)$. The 4 redundant CRC bytes are the coefficients of $r(x)$.

Referring to FIG. 1, the circuit for the LFSR encoder is shown.

Blocks 61, 62, 63, and 64 denote multiplication by $\alpha^6$, $\alpha^{213}$, $\alpha^{24}$ and $\alpha^{210}$, respectively. Each of the multiplication operations are further described on a generic byte $a0+a1\alpha+a2\alpha^2+a3\alpha^3+a4\alpha^4+a5\alpha^5+a6\alpha^6+a7\alpha^7$ as follows, where the output is a byte $b0+b1\alpha+b2\alpha^2+b3\alpha^3+b4\alpha^4+b5\alpha^5+b6\alpha^6+b7\alpha^7$.

As shown in FIG. 1, the circuit is opened by switch 75 for the last i bytes, $0 \leq i \leq 4$.

For decoding, the same circuit is used plus a comparator. The first k bytes are encoded using the circuit and the i redundant bytes obtained are compared to the i redundant bytes in the received vector. If they coincide, the k information bytes are accepted and the decoder concludes that no errors have occurred. However, if they do not coincide, errors have occurred and an error detecting protocol is invoked.

Multiplication by $\alpha^6$
b0=a2⊕a5⊕a7
b1=a3⊕a6
b2=a2⊕a4⊕a5
b3=a2⊕a3⊕a6⊕a7
b4=a3⊕a4⊕a7
b5=a2⊕a4⊕a7
b6=a0⊕a3⊕a5
b7=a1⊕a4⊕a6
Multiplication by $\alpha^{213}$
b0=a2⊕a3⊕a4⊕a6
b1=a3⊕a4⊕a5⊕a7
b2=a2⊕a3⊕a5
b3=a0⊕a2
b4=a0⊕a1⊕a3
b5=a0⊕a1⊕a3⊕a6
b6=a0⊕a1⊕a2⊕a4⊕a7
b7=a1⊕a2⊕a3⊕a5
Multiplication by $\alpha^{24}$
b0=a3⊕a4
b1=a0⊕a4⊕a5
b2=a0⊕a1⊕a3⊕a4⊕a5⊕a6
b3=a1⊕a2⊕a3⊕a5⊕a6⊕a7
b4=a0⊕a2⊕a3⊕a4⊕a6⊕a7
b5=a0⊕a1⊕a5⊕a7
b6=a1⊕a2⊕a6
b7=a2⊕a3⊕a7
Multiplication by $\alpha^{210}$
b0=a0⊕a5⊕a6⊕a7
b1=a0⊕a1⊕a6⊕a7
b2=a0⊕a1⊕a2⊕a5⊕a6
b3=a0⊕a1⊕a2⊕a3⊕a5
b4=a1⊕a2⊕a3⊕a4⊕a6
b5=a2⊕a3⊕a4⊕a6
b6=a3⊕a4⊕a5⊕a7
b7=a4⊕a5⊕a6, where ⊕ indicates an exclusive OR function.

Referring to FIG. 1, blocks 64, 65, 66, and 67 perform exclusive OR logical functions and blocks 150, 160, 170, and 180 are byte wide LFSR registers. Assume that the data message or packet size is k bytes and the redundancy coding adds i bytes to the message or packet. The output 77 of the circuit is connected directly to the input 78 to the circuit for the first k bytes by the closed switch 79, while exclusive OR circuit 67 is disconnected from output 77 by an open switch 76 for the first k bytes. The first k bytes are fed back to multipliers 60, 61, 62, and 63 by switch 75 which is closed. For the i bytes, which follow serially after the k bytes, switch 79 is opened to disconnect the input 78 from the output 77, and switch 76 is closed to connect the output of exclusive OR circuit 67 to output 77. Also for the i bytes, switch 75 is opened to break the feedback path to the multipliers 60, 61, 62, and 63.

Figure 2:
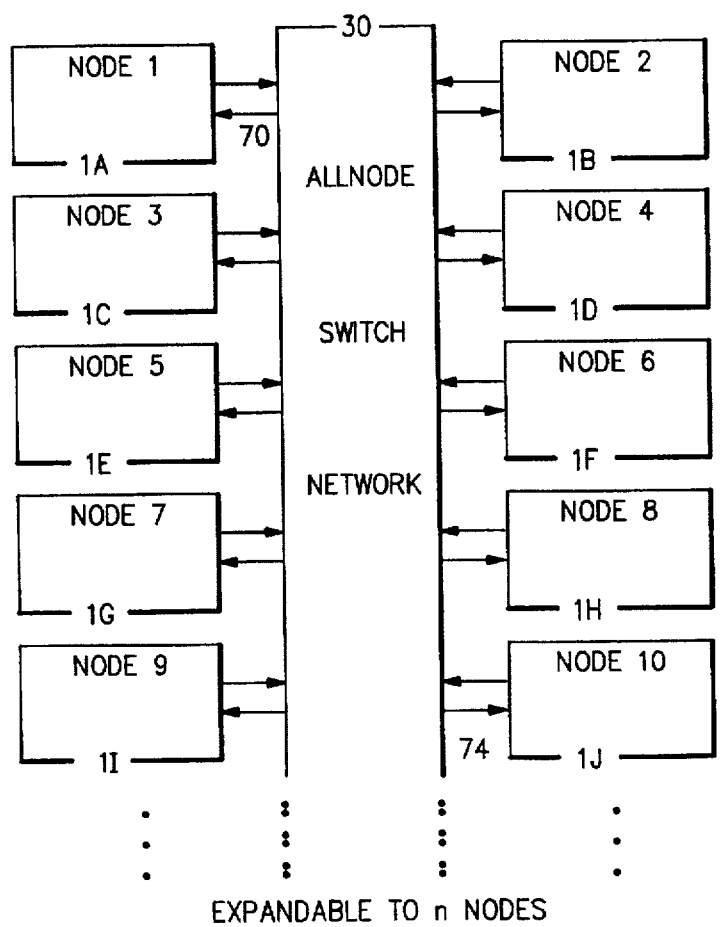
FIG. 2 illustrates generally our preferred embodiment of a parallel system comprised of multiple nodes and a switching network, which is the preferred media for transporting data messages appended by the present invention variable cyclic redundancy coding method.

The preferred embodiment of the disclosed Variable CRC Apparatus is described here in relation to its use for providing error detection capabilities for message passing parallel systems. Referring to FIG. 2, the preferred method of interconnecting n parallel nodes via a multi-stage, interconnection network 30 using switching elements is shown.

The preferred switching means is the basic digital asynchronous and unbuffered switching concept disclosed in U.S. Ser. No. 07/677,543, "All-Node Switch, An Unclocked, Unbuffered Asynchronous Switching Apparatus" by H. T. Olnowich et al, now abandoned and continued as U.S. Ser. No. 08/457,789, filed Jun. 2, 1995. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

Switch network 30 can be any type of multi-stage, torus, or hypercube network that permits either small or massive expansion by permitting several or massive number of nodes to interconnect. However, the preferred embodiment of the switching means is the basic digital asynchronous and unbuffered switching concept disclosed in U.S. Ser. No. 07/677,543, "All-Node Switch, An Unlocked, Unbuffered Asynchronous Switching Apparatus" by H. T. Olnowich et al, now abandoned and continued as U.S. Ser. No. 08/457, 789filed Jun. 2, 1995, which is a unidirectional switch implementation. The preferred embodiment uses only unidirectional interfaces, and therefore FIG. 2 shows the switch interface 70 to be comprised of two unidirectional sets of lines, one carrying data from node 1A, and one carrying data to the switch network from node 1A, and one carrying data from the switch network to node 1A.

It is here understood that the FIGS. 3 to 9 are illustrations which are common to U.S. Ser. No. 07/677,543, the parent application which is incorporated herein by reference as to all of its contents. FIGS. 3 to 9 refer to a 4×4 crossbar implementation of the ALLNODE Switch to illustrate the principles and speed of the switching concept.

Figure 3:
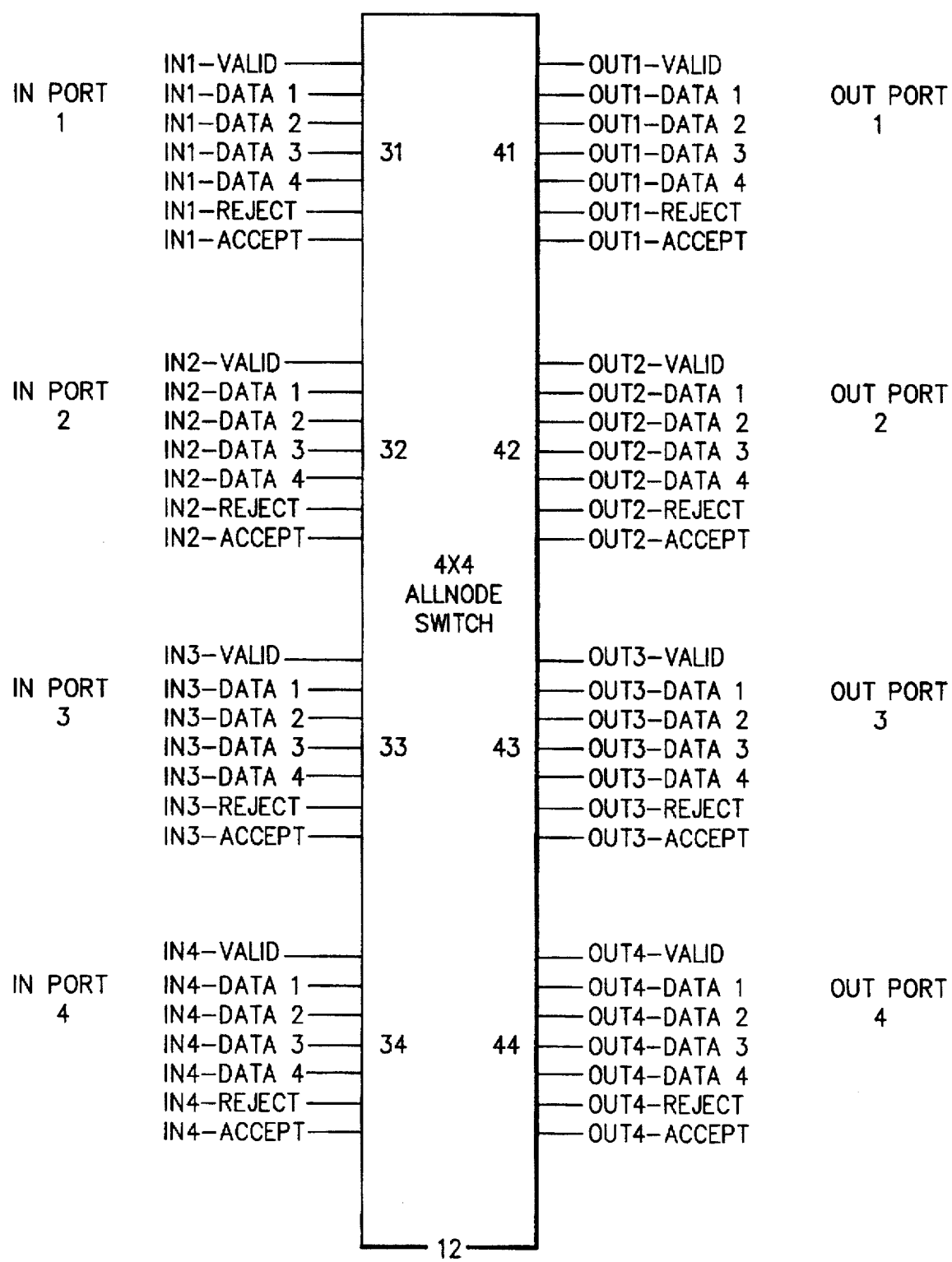
FIG. 3 illustrates a four input and four output (4×4) crossbar switching apparatus, which has the capability of providing the disclosed fully parallel switching means for interconnecting up to four nodes.

Referring to FIG. 3, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input. 4 to Output 1.

The invention switching apparatus 12 is unidirectional, which means that data flows in only one direction across the said switching apparatus 12, that being from input to output. Switching apparatus 12 interfaces are defined in detail in FIG. 3. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 2, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

Figure 4:
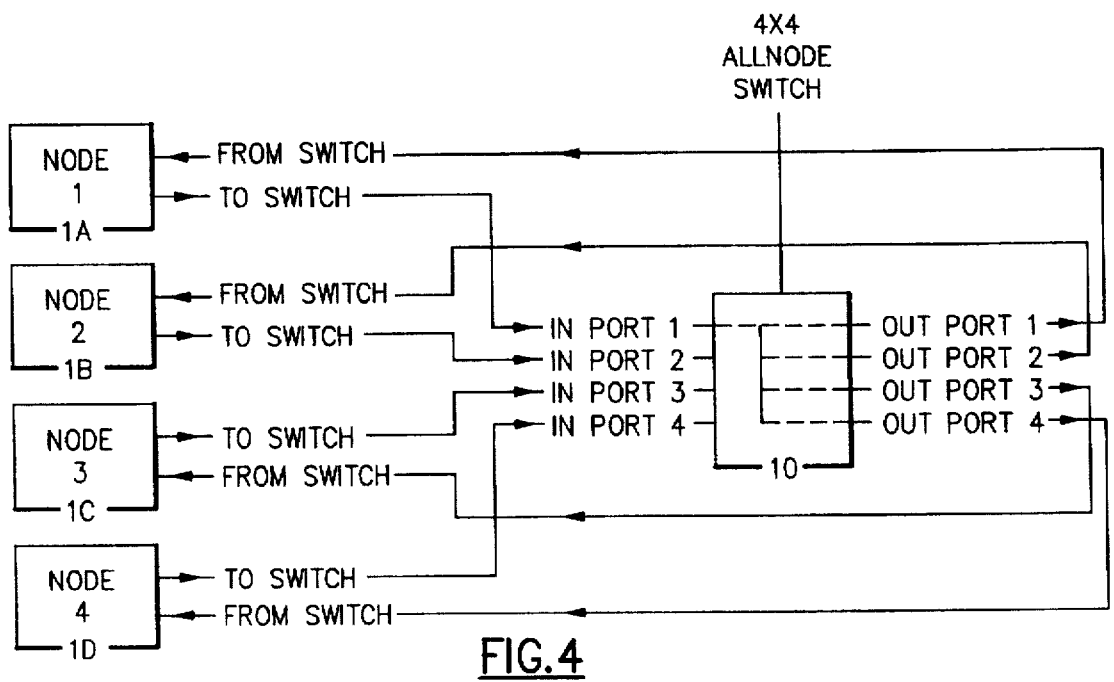
FIG. 4 illustrates the interconnections required to a four input and four output (4×4) crossbar switching apparatus to provide full interconnection amongst four nodes.

As illustrated by FIG. 4 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 4 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (20, 22, 24, and 26) by connecting the 4×4 ALL-NODE switching apparatus 10 as shown in FIG. 3. Each node 1A, 1B, 1C, and 1D has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 5:
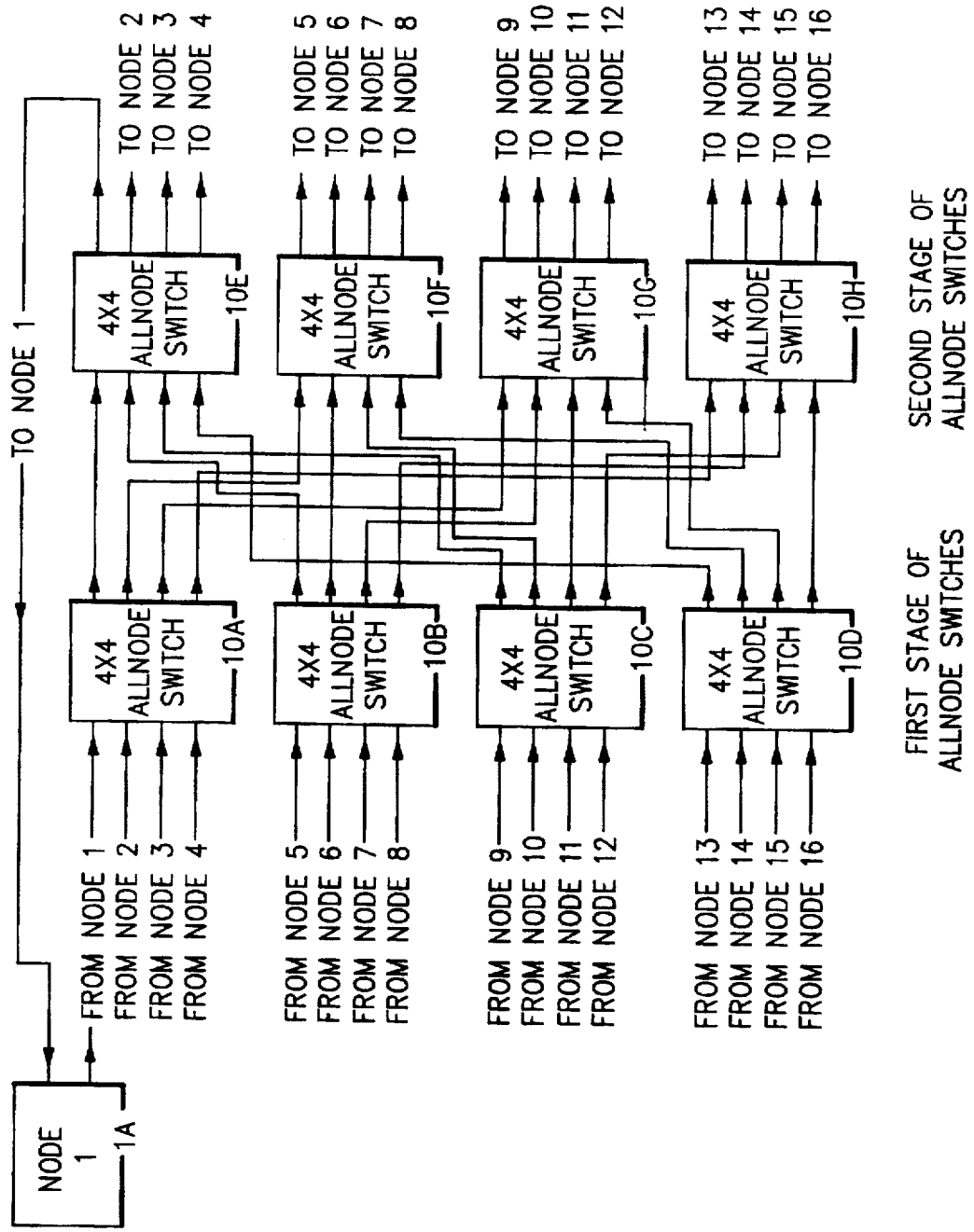
FIG. 5 shows a typical method for cascading the 4×4 disclosed embodiment of the invention switching apparatus to accomodate systems having more than 4 nodes.

Referring to FIG. 5, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner.

Figure 6:
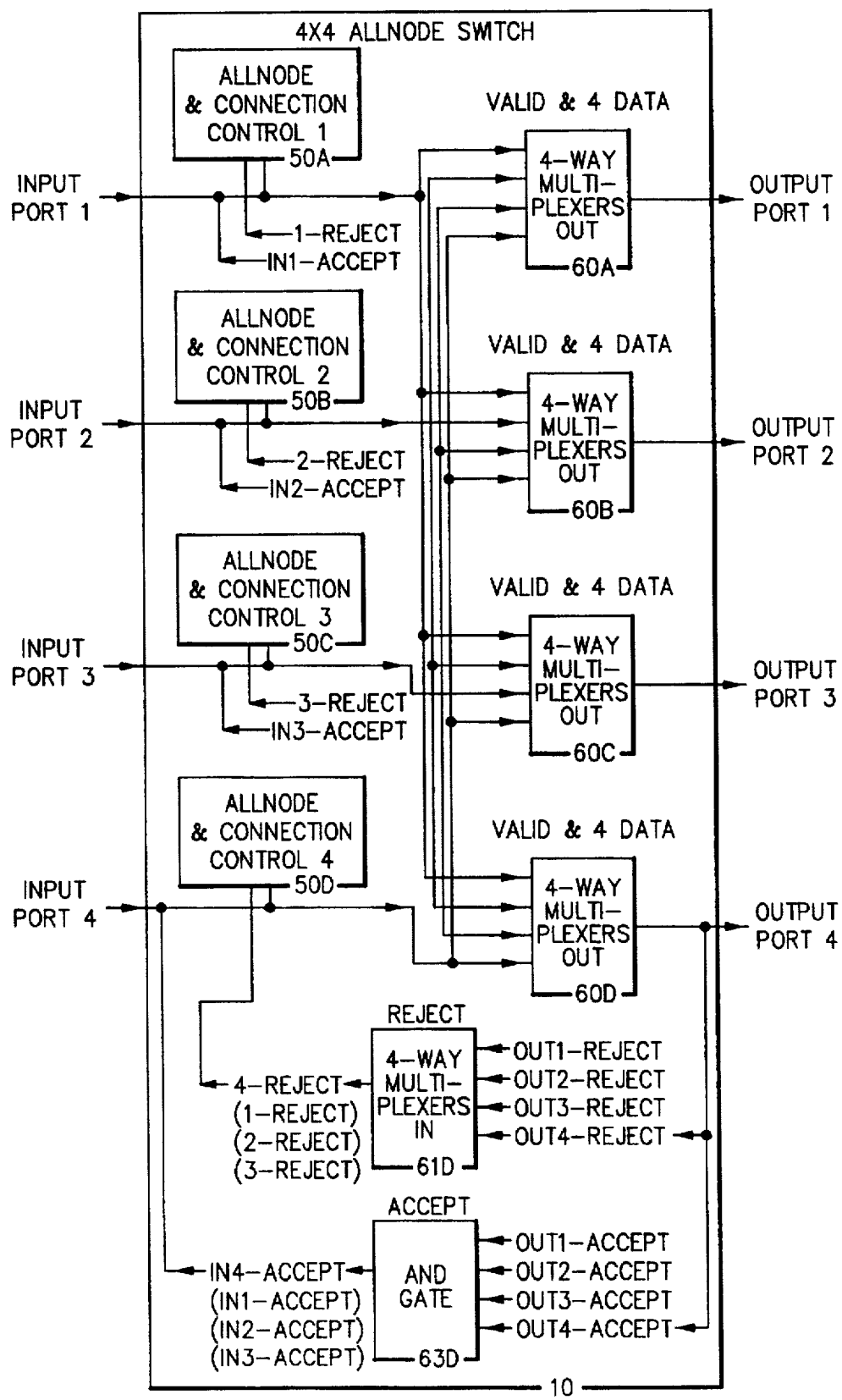
FIG. 6 shows a schematic block diagram of the simple digital data flow and control path implementations of the 4×4 crossbar switching apparatus, which has the capability of being used with the present invention to provide fully parallel switching means for interconnecting up to four system nodes for the purpose of transferring digital data. Previously disclosed in the prior parent application U.S. Ser. No. 07/677,543 now abandoned and continued as U.S. Ser. No. 08/457,789, filed Jun. 2, 1995.

Referring to FIG. 6, a functional diagram of the simple data flow across ALLNODE switching apparatus 10 is illustrated. The VALID and four data lines at each input port, inside the switch, and at each output port are represented by a single line in FIG. 6 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 7:
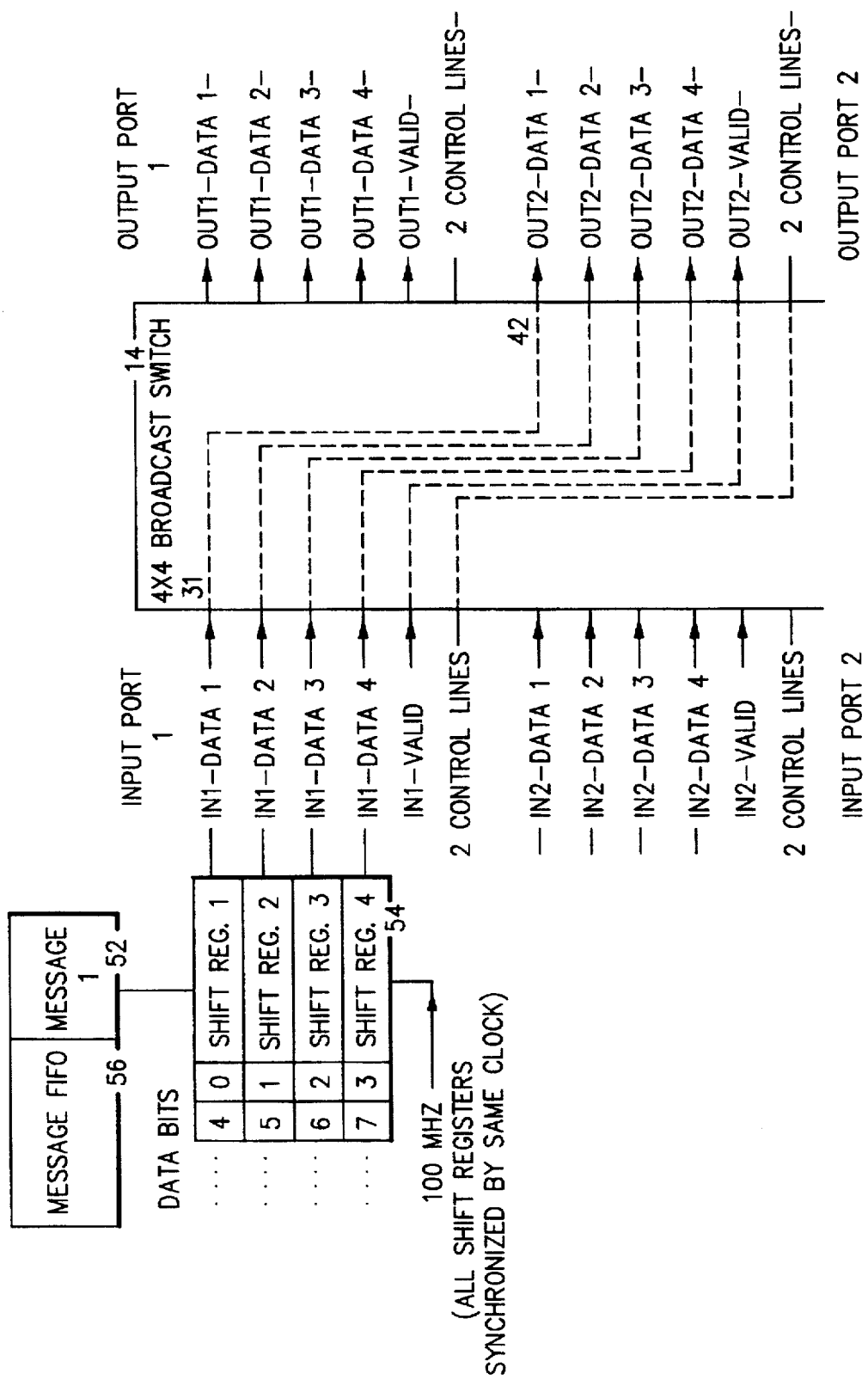
FIG. 7 illustrates a typical method for generating parallel control and and multiple line serial digital data information to be sent to the 4×4 prior parent embodiment of the invention switching apparatus over four synchronous data lines.

Referring to FIG. 7, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34 of FIG. 3) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 7 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 8:
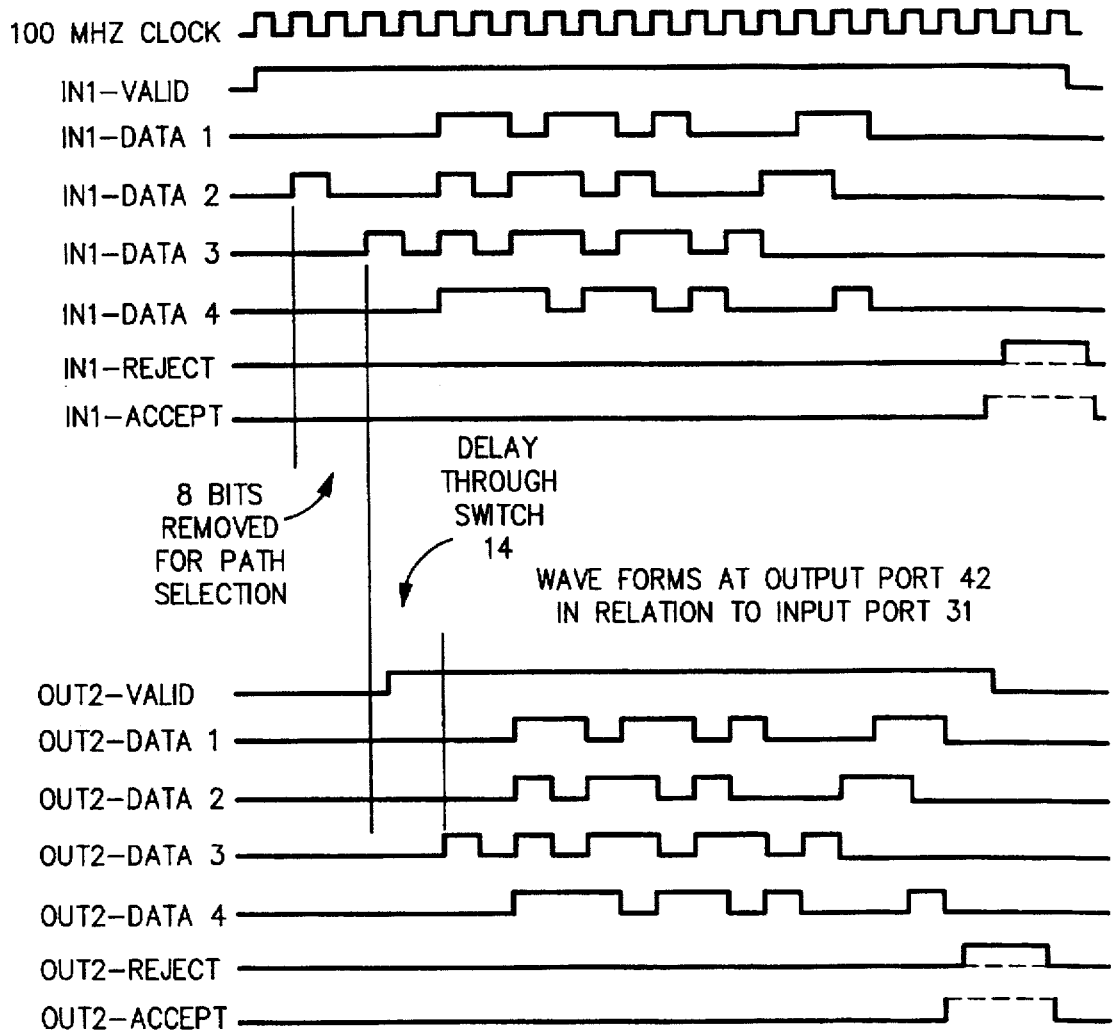
FIG. 8 shows a typical timing diagram for routing the digital interface signals arriving at one input port of the 4×4 prior parent embodiment of the invention switching apparatus to one output port.

Referring to FIG. 8, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 9:
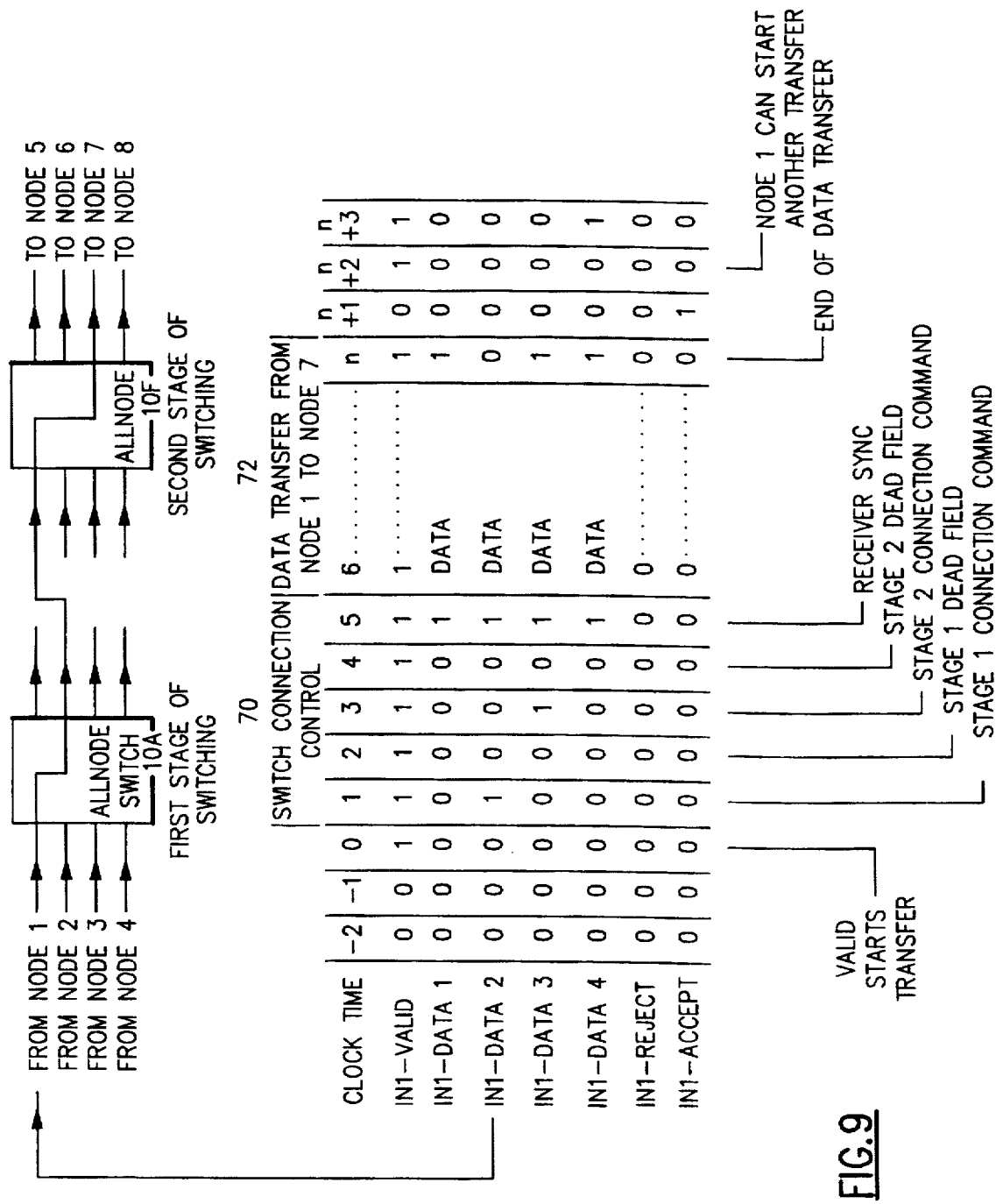
FIG. 9 illustrates the typical method for selecting and establishing a transmission path through a network comprised of the invention switching apparatus for the purpose of sending digital data from one node to another.

Referring to FIG. 9, a typical example of the exact serial bit patterns and control signal activation is shown for sending control and digital data information to switching apparatus 10. The example references the cascaded, two stage switching network shown in FIG. 5 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 5. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodiment, as shown in FIG. 8 is an all ones synchronization field at time 5, followed by the NRZ data message. The data message can specify the word count length of the transfer.

The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 7), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:
1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection. If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

The parallel system, shown in FIG. 2, sends messages over a multi-stage network comprised of three components—Message Header, Message Data, and Variable Length CRC (VLCRC) bytes. The VLCRC bytes are used to check both the header and data portions of the message. For simplicity in this description, the header will be assumed to be 4 bytes including an 8-bit byte count field which defines the number of bytes in the message including the 4 header bytes and all the data bytes—but not the CRC bytes. In addition, the data will be assumed to be transmitted in multiples of 4 bytes—this is only for this example and ease of description—the invention requires no such restriction.

The Variable Length CRC Apparatus is implemented in two sections—the first being on the sending side of the switch network where the CRC bytes are appended to the message for the purpose of providing a means for checking the accuracy of the message reception. The complete message is transmitted without modification through network 30 and arrives at the second section on the receiving side of network 30, where the CRC bytes are regenerated based on the incoming header and data bytes and then checked against the CRC bytes sent with the message.

Figure 10A:
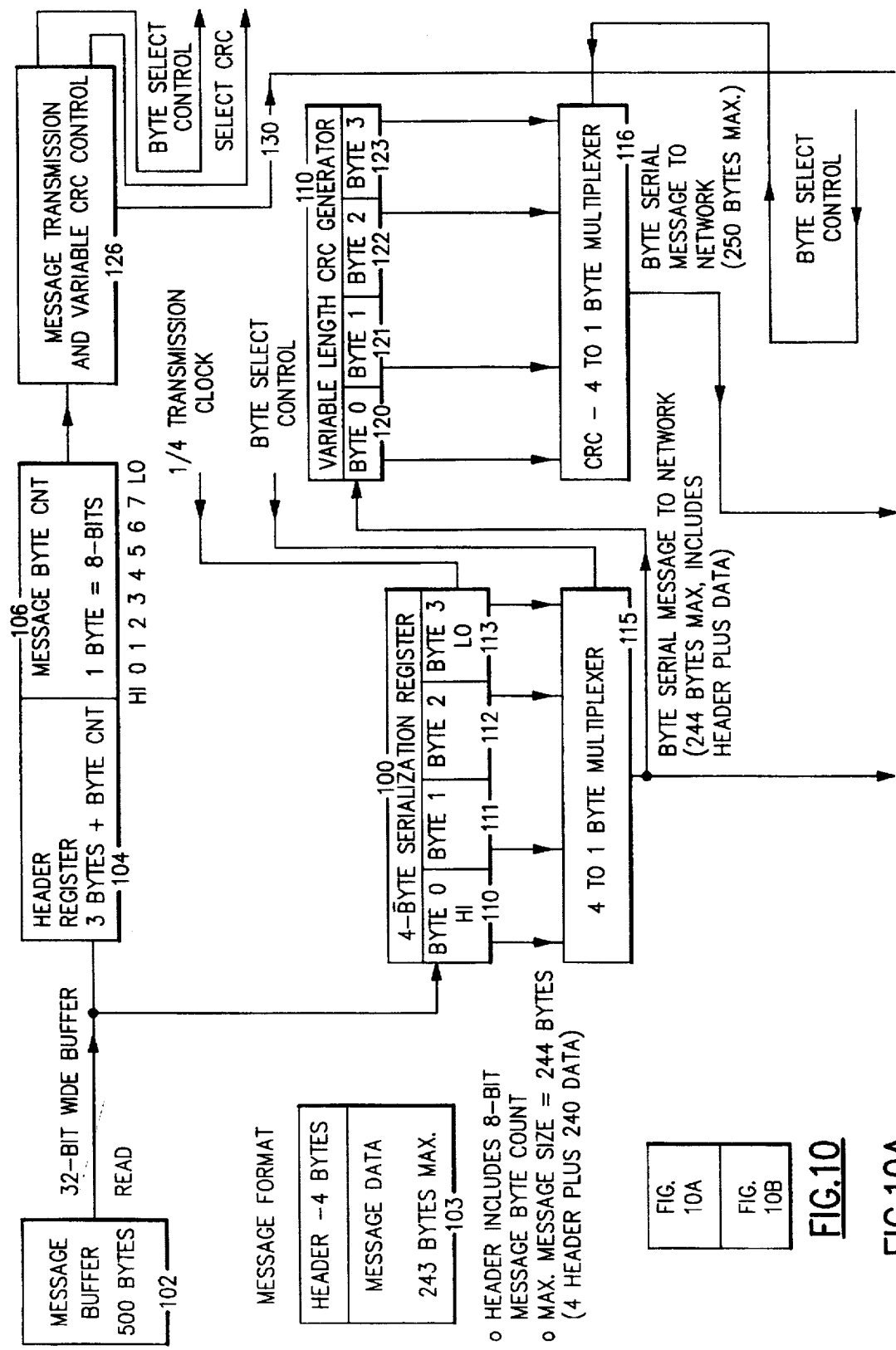
FIG. 10 illustrates a typical schematic and timing drawing for generating at any sending node of a parallel system a data message and appending the said message with the present invention of a variable cyclic redundancy code.
Figure 10B:
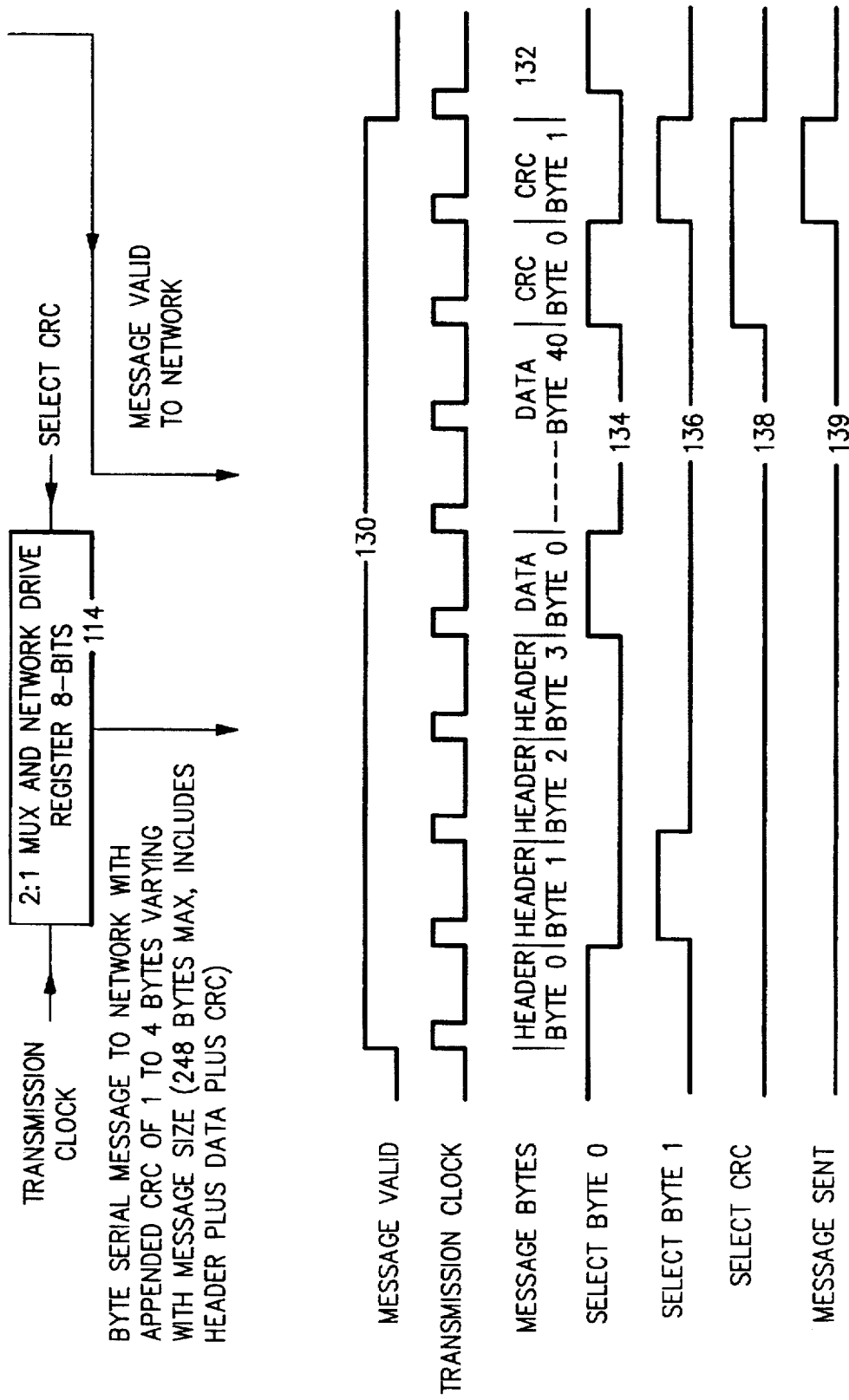

The sending section of the Variable Length CRC Apparatus is shown in FIG. 10. A message comprising two components (header and data), as shown in block 100, is stored in message buffer 102 awaiting transmission over the network. The message is prepared for transmission over the network by being read 4 bytes (32-bits) at a time from the buffer 102 and transferred to 4-Byte Serialization Register 108. Multiplexer 115 selects one byte at a time from register 108 and forms a byte stream of header and subsequent data bytes which goes through multiplexer 114 and then to the network. Multiplexer 114 is used to append the desired number of CRC bytes to the end of the message.

Line 132 in the timing chart of FIG. 10 shows a sample message sent to the network comprised of 4 header bytes followed by 48 data bytes followed by 2 CRC bytes. Line 130 shows how the MESSAGE VALID signal is a logical 1 for the entire message transmittal, with its rise defining the beginning of the message transmittal and its fall defining the end of message transmittal. The MESSAGE VALID signal is transmitted through the network as well as byte wide data to totally define and bracket the message. The transmission clock defines the byte transmittal rate and every rise of the clock causes a new byte of information to be sent to the network. Since the header and data occur as multiples of 4 bytes, four Select Byte signals (like 134 and 136) are used to define which byte is selected from register 108 by Multiplexer 115. Likewise, the same four Select Byte signals are used to control multiplexer 116 as it selects which CRC bytes are to be appended to the message through multiplexer 114.

The output of Multiplexer 115, a serial byte stream of header and data, is also routed to block 118, where combinational logic and registers are used to generate up to 4 bytes of CRC characters in the manner defined by FIG. 1.

In addition, as the header bytes are read from buffer 102, they are stored and held in registers 104 and 106 for the duration of the complete message transmittal. Register 106 contains the byte count of the message and the header and is allowed to have a value from 4 (header only) to 244 bytes (4 header bytes plus 240 data bytes max). The byte count in register 106 feeds block 126 which controls the MESSAGE VALID and Byte Select Signals, and determines when to append the CRC bytes and how many to append.

Figure 11A:
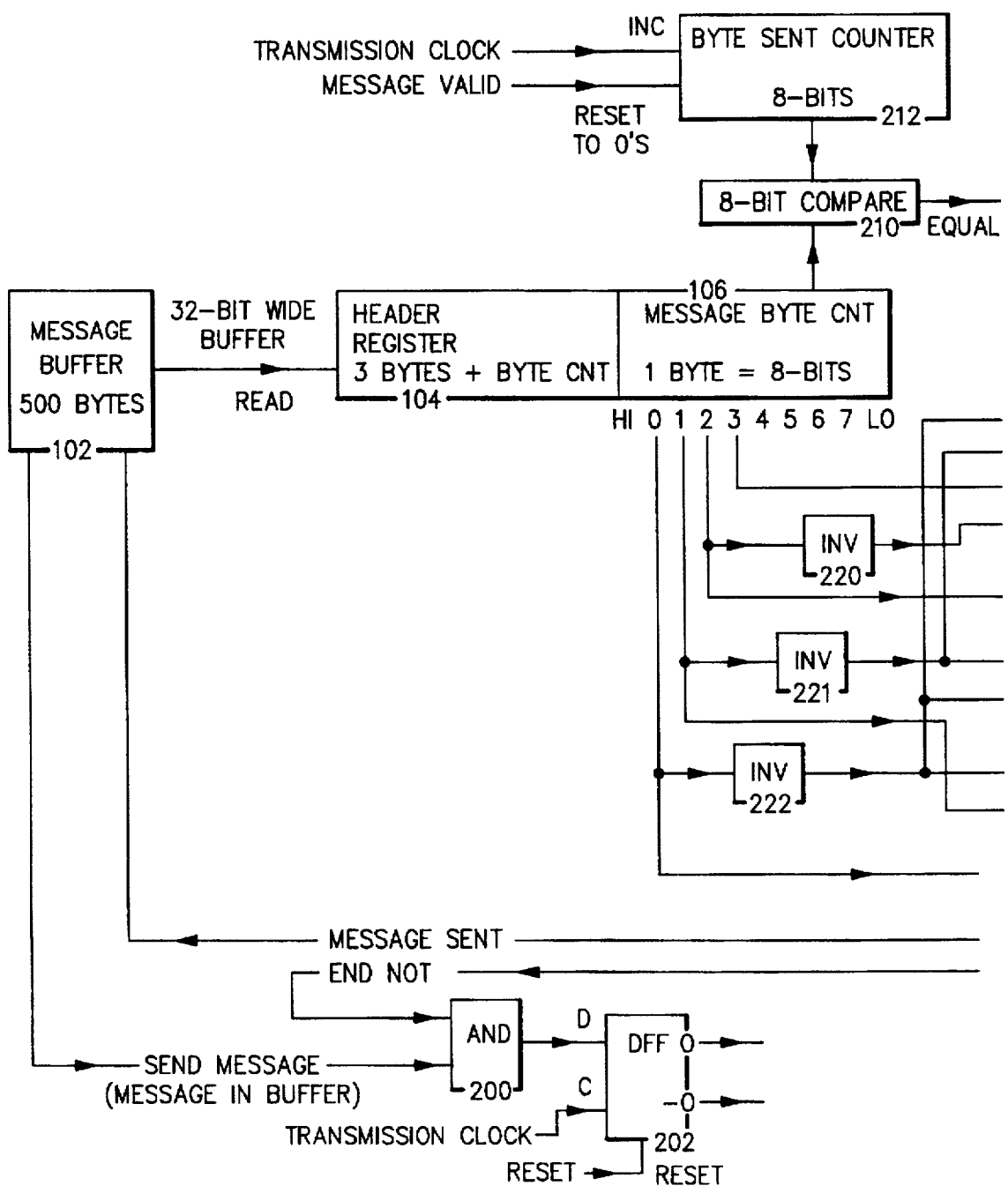
FIG. 11 illustrates a typical functional and logic implementation of the apparatus for determining the variable size (number of bytes) of the cyclic redundancy code field to be appended to each data message by the present invention of a variable cyclic redundancy code.
Figure 11:
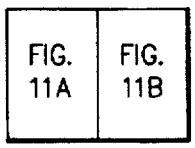

FIG. 11 shows further details of the implementation of block 126. When the buffer 102 has an assembled message that is ready to be transmitted, it informs block 126 by raising the "Send Message" signal. This signal passes through AND gate 200 and causes latch 202, MESSAGE VALID, to set at the rise of the transmission clock and thus start the transmittal of the message to the network. The MESSAGE VALID signal being a zero indicates no message is being sent and causes the Select Byte latches 240 to 246 to be reset to the state where Select Byte 0 is active and the other 3 are inactive. Message Valid going to a one causes the latches 240 to 246 to become enabled and causes a different Select Byte signal to go active on a mutually exclusive and cyclic basis every time the Transmission clock rises. This continues until the MESSAGE VALID signal again goes to 0 after the message has been transmitted. The MESSAGE VALID signal also resets the Byte Sent Counter 212 to 00000001 (binary) when inactive and enables 212 to count when active. Counter 212 increments at every rise of the Transmission clock after MESSAGE VALID goes active (but not at the rise of the clock that sets MESSAGE VALID). 8-bit Compare 210 detects when the correct number of header and data bytes have been transmitted by determining when the Byte Sent Count 212 equals the Message Byte Count in register 106. When equal block 210 generates the LAST BYTE signal when the two counts are equal. The LAST BYTE signal defines that the next subsequent byte to be transmitted to the network should be the first CRC byte; this condition is latched in latch 236 and generates the Select CRC signal. Latch 236 is fedback on itself through gate 238 which keeps the latch active until it is reset by the MESSAGE VALID signal going to a 0. The Select CRC signal causes MUX 114 in FIG. 2 to switch to selecting the byte stream to the network to now come from the CRC MUX 116 to append the desired number of CRC bytes.

Various algorithms can be used to determine how many variable CRC bytes are to be transmitted. The preferred embodiment shown in FIG. 11 determines the number of CRC bytes based on the Message Byte Count stored in register 106. The algorithm used is that if bit 0 is set in register 106 indicating that the entire message is greater than 128 bytes, 4 CRC bytes are appended as detected by the SEND 4 CRC BYTES signal. If bit 0 is NOT set in register 106 and bit 1 is set indicating that the entire message is between 64 and 128 bytes, 3 CRC bytes are appended as detected by AND gate 228 and the SEND 3 CRC BYTES signal. If bit 0 and bit 1 are NOT set in register 106 and bit 2 is set indicating that the entire message is between 32 and 64 bytes, 2 CRC bytes are appended as detected by AND gate 226 and the SEND 2 CRC BYTES signal. If bits 0, 1 and 2 are NOT set in register 106 and bit 3 is set indicating that the entire message is less than 32 bytes, 1 CRC byte is appended as detected by AND gate 224 and the SEND 1 CRC BYTE signal. The SEND X CRC BYTES signals are ANDED in gates 231 to 234 with the indications of which byte is currently being sent and the Select CRC signal which defines the CRC append period. When the selected number of CRC Bytes have been sent, the last CRC byte (1 to 4 bytes) is detected by OR gate 230 and causes the MESSAGE VALID signal 202 to reset through inverter 235 and gate 200, thus completing the message transmission. At the same time, the MESSAGE SENT signal is issued to buffer 102 informing it that the message has been sent and it can drop the SEND MESSAGE signal until it has a subsequent message to send. The invention covers many other embodiments for determining how many CRC bytes are to be transmitted at the end of the message—even variable selections that can be changed under software control.

Figure 12A:
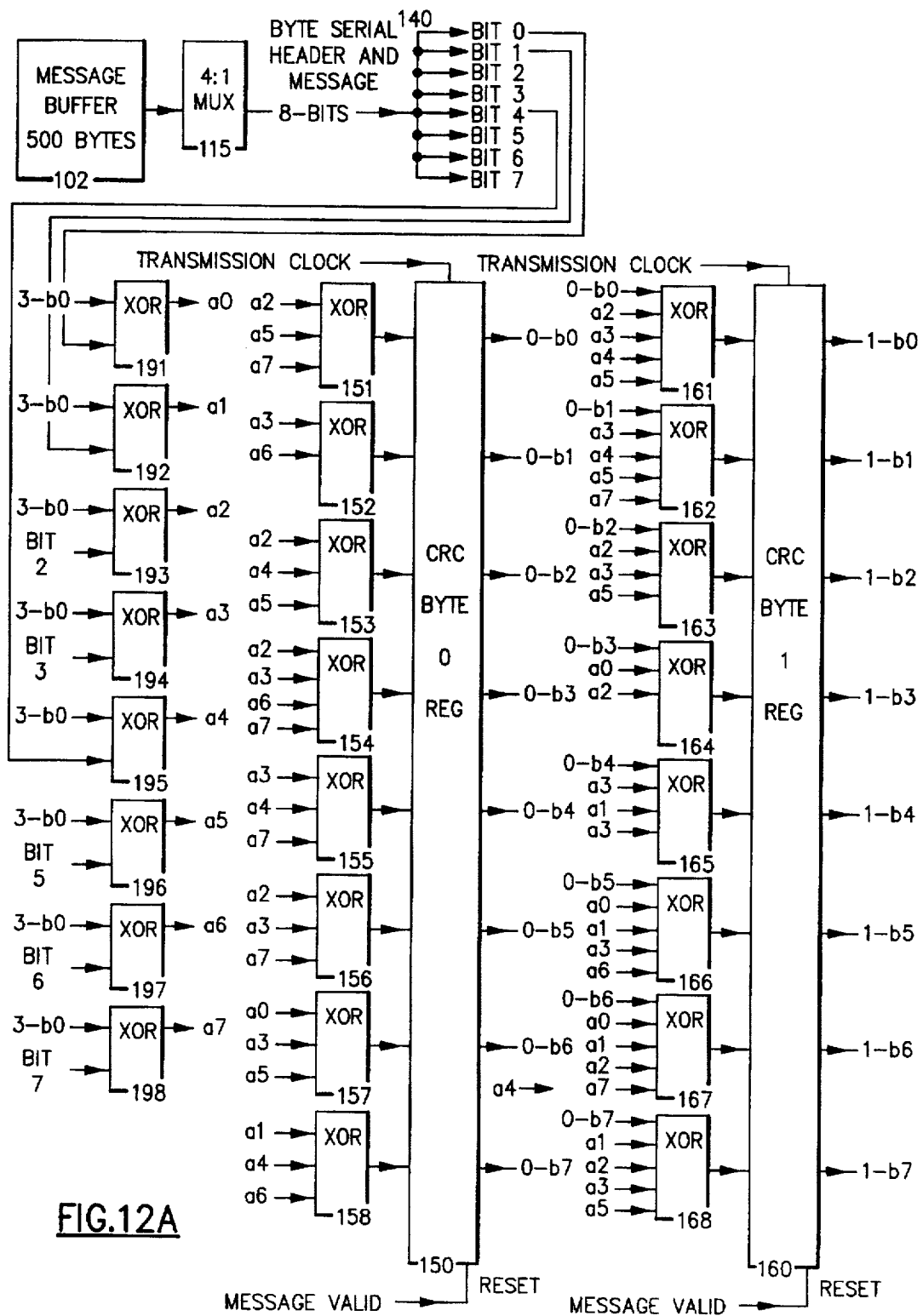
FIG. 12 illustrates a typical functional and logic implementation of the apparatus for generating the bit patterns of cyclic redundancy code field to be appended to each data message by the present invention of a variable cyclic redundancy code.
Figure 12B:
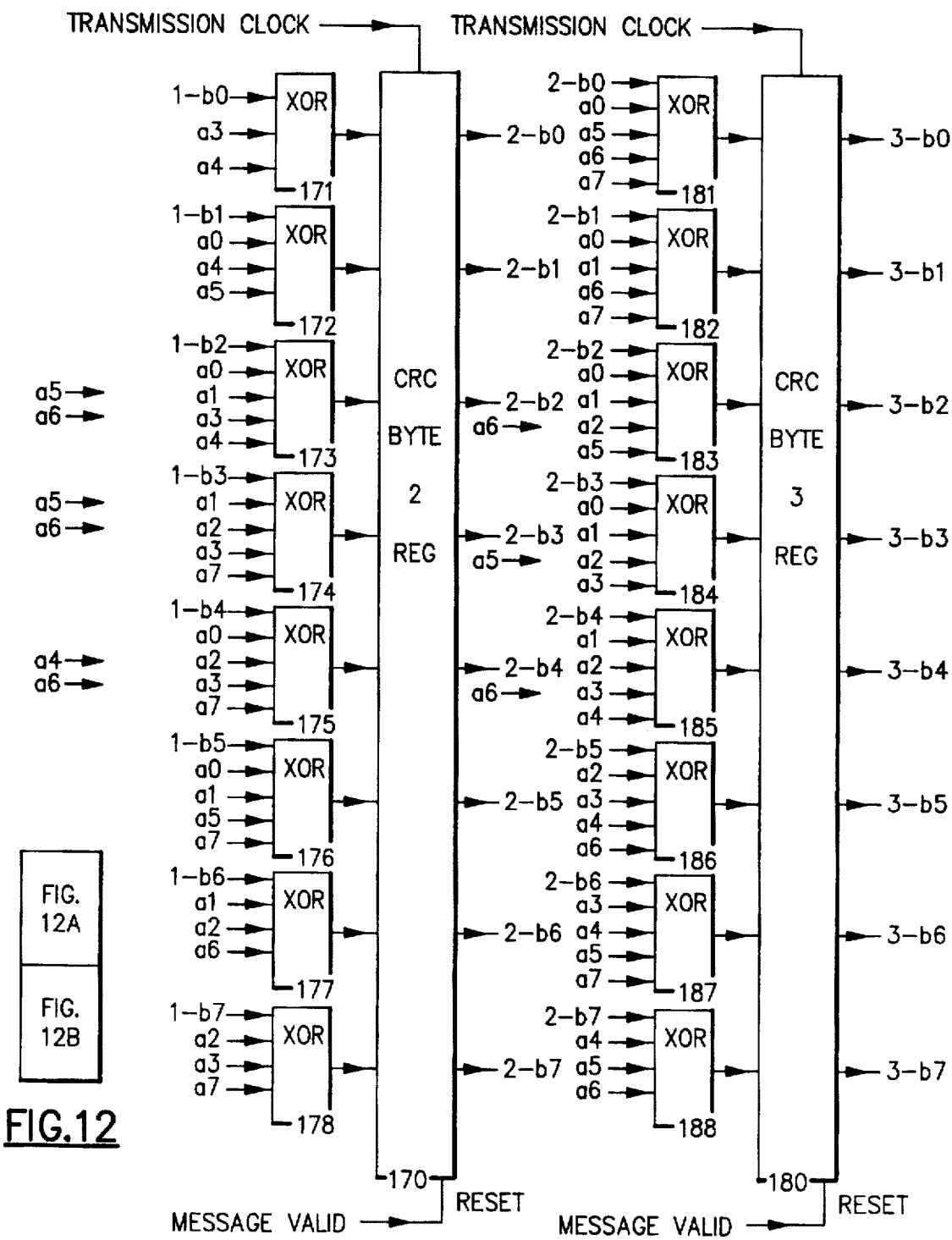

Referring to FIG. 12 the detailed logic associated with block 118 of FIG. 10 is shown. This logic generates and saves in LFSR registers 150, 160, 170, and 180, the 4 CRC Bytes which can be selected to be appended to the message. These registers are selected sequentially starting at register 150 and sent to the network as successive bytes through multiplexers 116 and 114 until the desired number of bytes have been appended. The logic shown in FIG. 12 generates the variable length CRC polynomial that has been described earlier and is disclosed here as a polynomial for variable length CRC generation.

Figure 13B:
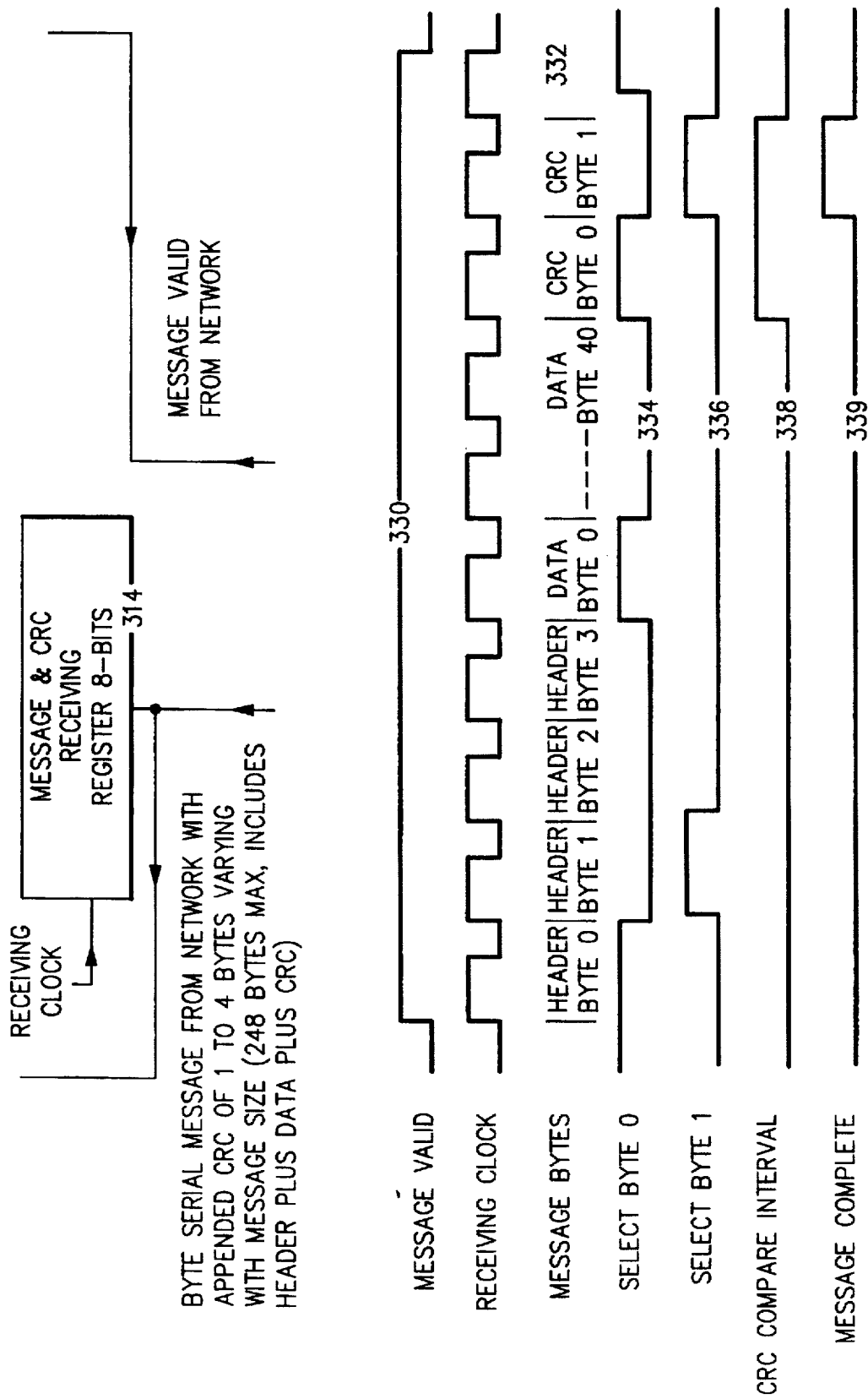
FIG. 13 illustrates a typical schematic and timing drawing for receiving and checking at any receiving node of a parallel system a data message with appended variable cyclic redundancy code, in accordance with the present invention.

The Receiving section of the Variable Length CRC Apparatus is shown in FIG. 13. As a message arrives from the network, it is comprised of three components (header, data, and CRC),as shown in block 300 (only the header and data bytes are stored to buffer 302. Header and Data bytes are collected in 4-Byte Parallelization Register 308 as 4 byte entities and immediately stored to buffer 302 as every fourth byte arrives.

Referring to the timing chart of FIG. 13, the MESSAGE VALID signal 330 from the network informs the Receiving section of the incoming message by going to a logical 1 and remaining at a 1 for the entire message transmittal. The Receiving clock is synchronous to the byte transmittal rate and every rise of the clock causes a new byte of information to be received and stored in registers 308 and 314. Since the header and data occur as multiples of 4 bytes, four Select Byte signals (like 334 and 336) are used to define which byte of register 308 is to be stored at each Receiving clock time.

The incoming byte stream is also clocked into register 314 at every Receiving Clock time and presents a serial byte stream of header, data, and CRC to block 318, where combinational logic and registers are used to generate up to 4 bytes of CRC checking characters in the manner defined by FIG. 1.

In additon, as the header bytes are received, they are stored and held in registers 304 and 306 for the duration of the message reception. Register 306 contains the byte count of the message, which feeds block 326 to control the MESSAGE VALID and Byte Select Signals, and determines when to check the CRC bytes and how many bytes to check.

Figure 14B:
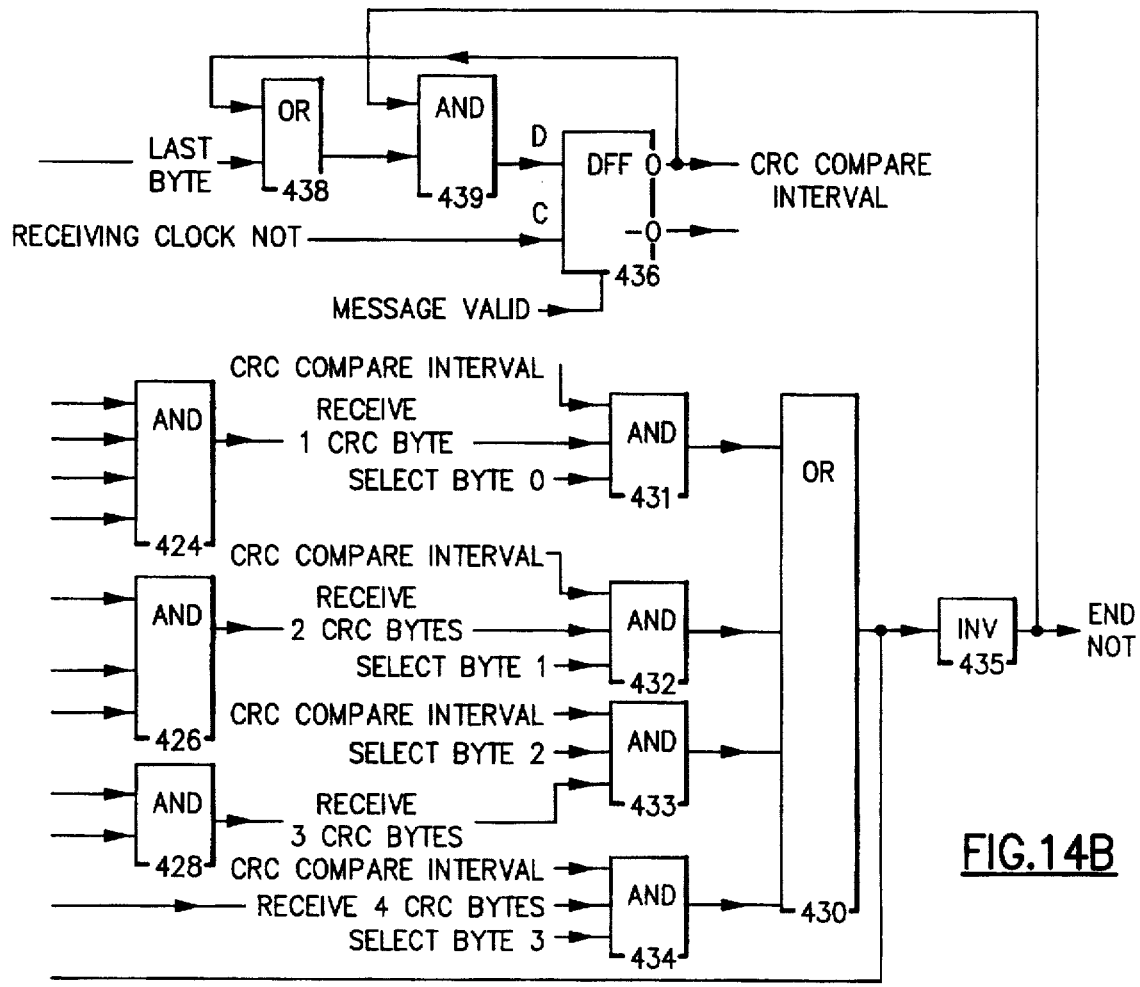
FIG. 14 illustrates a typical functional and logic implementaion of the apparatus for receiving and checking a variable size (number of bytes) of the cyclic redundancy code field, in accordance with the present invention.
Figure 14B:
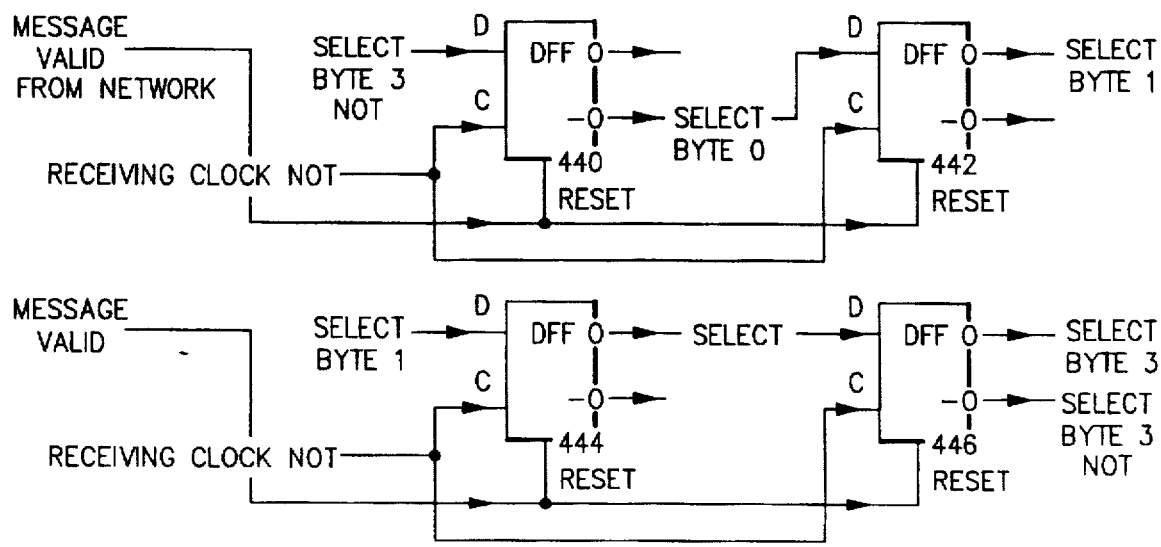

FIG. 14 shows further details of the implementation of block 326. The MESSAGE VALID signal being a zero indicates no message is being received and causes the Select Byte latches 440 to 446 to be reset to the state where Select Byte 0 is active and the other 3 are inactive. Message Valid going to a one causes the latches 440 to 446 to become enabled and causes a different Select Byte signal to go active on a mutually exclusive and cyclic basis every time the Receiving clock falls. This continues until the MESSAGE VALID signal again goes to 0 after the message has been completely received. The MESSAGE VALID signal also resets the Byte Received Counter 412 to 00000001 (binary) when inactive and enables 412 to count when active. Counter 412 increments at every fall of the Receiving clock after MESSAGE VALID goes active. 8-bit Compare 410 detects when the correct number of header and data bytes have been received by determining when the Byte Received Count 412 equals the Message Byte Count in register 306. When equal block 410 generates the LAST BYTE signal when the two counts are equal. The LAST BYTE signal defines that the next subsequent byte to be received from the network is the first CRC byte; this condition is latched in latch 436 and generates the CRC Compare Interval signal. Latch 436 is fedback on itself through gate 438 which keeps the latch active until it is reset by the MESSAGE VALID signal going to a 0. The CRC Compare Interval signal causes CRC Comparison Checker 315 in FIG. 13 to become active and to check the CRC bytes arriving from the network against those calculated by block 318. When the selected number of CRC Bytes have been received and checked by block 315, the last CRC byte (1 to 4 bytes) is detected by OR gate 430 and propagates through inverter 435 and AND gate 439 to reset the CRC Compare Interval Signal 436, thus completing the message reception. At the same time, the MESSAGE COMPLETE signal is issued to buffer 302 informing it that a complete and checked message has been stored to it. If the CRC comparison fails, the CRC Error signal is generated instead.

The receiving section uses the same algorithm and logic as used by the sending section and as described above to both determine the number CRC bytes and to generate the CRC bytes. The logic in block 318 is identical to the logic in block 118 as shown in FIG. 12.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A variable cyclic redundancy code apparatus for use by a multi-stage bufferless switching network, the network comprising:
   a plurality of bufferless switching apparatuses cascaded into stages, each said switching apparatus including a plurality of switch inputs and a plurality of switch outputs, each of the switch outputs of each said switching apparatus coupled to a different switch input of others of said switching apparatuses, switch outputs of last stage switching apparatuses comprising network output ports and switch inputs of first stage switching apparatuses comprising network input ports; and
   a plurality of nodes each coupled to one of the network output ports and to one of the network input ports, each said node comprising means for receiving a data message and means for sending a data message including a connection request;
   said switching apparatuses each including:
      connection means for establishing a communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active communication paths between a plurality of network input ports and a plurality of network output ports in response to a plurality of connection requests received separately or simultaneously at said plurality of network input ports, said simultaneously active communication paths for transmitting a plurality of data messages received separately or simultaneously at said plurality of network input ports to said plurality of network output ports;
   said variable cyclic redundancy code apparatus comprising:
   first buffer means for storing the data message at a sending node;
   first generating means for generating a first cyclic redundancy code at the sending node, the cyclic redundancy code comprising a plurality of error checking bits;
   appending means coupled to said means for sending a data message for appending to said data message the cyclic redundancy code;
   second buffer means for storing the data message at a receiving node;
   second generating means for generating a second cyclic redundancy code at the receiving node, the second cyclic redundancy code comprising a plurality of error checking bits; and
   comparing means for comparing the first cyclic redundancy code to the second cyclic redundancy code and for indicating a comparison failure.

2. The variable cyclic redundancy code apparatus according to claim 1 wherein the number of said error checking bits is based on the length of said data message.

3. The variable cyclic redundancy code apparatus according to claim 1 wherein the network input and output ports comprise a plurality of control lines, a first of said control lines for sending back to the sending node an acceptance signal for indicating to the sending node an error-free transmission of the data message, a second of said control lines for sending back to the sending node a rejection signal for indicating to the sending node an erroneous transmission of the data message.

4. The variable cyclic redundancy code apparatus according to claim 1 wherein the cyclic redundancy code is Reed-Solomon code.

5. A variable cyclic redundancy coding method for use in a multi-stage bufferless switching network, the network comprising:
   a plurality of bufferless switching apparatuses cascaded into stages, each said switching apparatus including a plurality of switch inputs and a plurality of switch outputs, each of the switch outputs of each said switching apparatus coupled to a different switch input of others of said switching apparatuses, switch outputs of last stage switching apparatuses comprising network output ports and switch inputs of first stage switching apparatuses comprising network input ports; and
   a plurality of nodes each coupled to one of the network output ports and to one of the network input ports, each said node comprising means for receiving a data message and means for sending a data message including a connection request;
   said switching apparatuses each including:
      connection means for establishing a communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active communication paths between a plurality of network input ports and a plurality of network output ports in response to a plurality of connection requests received separately or simultaneously at said plurality of network input ports, said simultaneously active communication paths for transmitting a plurality of data messages received separately or simultaneously at said plurality of network input ports to said plurality of network output ports;
   said variable cyclic redundancy coding method comprising the steps of:

a) storing the data message in a buffer;
b) generating a cyclic redundancy code at a sending node based on the length of the data message;
c) appending the cyclic redundancy code to the data message;
d) transmitting the data message over the multistage network;
e) regenerating the cyclic redundancy code at a receiving node;
f) comparing the cyclic redundancy code appended to the data message with the cyclic redundancy code regenerated at the receiving node;
g) determining whether the data message is erroneous based on the comparing step.

6. The method according to claim 5, wherein the data message includes a message header and the step of regenerating the cyclic redundancy code is based on information contained in the message header.

7. The method according to claim 5, further comprising the step of:
h) sending back to the sending node a signal indicating whether the data message transmission is successful or erroneous.

* * * * *